(12) United States Patent
Hayashi

(10) Patent No.: US 7,302,409 B2
(45) Date of Patent: Nov. 27, 2007

(54) ACCOUNTING SYSTEM FOR ABSORPTION COSTING

(76) Inventor: Yuichiro Hayashi, 4-29, Hamada 1-chome, Sakata-shi, Yamagata-ken (JP) 998-0031

( * ) Notice: Subject to any disclaimer, the term of this patent is extended or adjusted under 35 U.S.C. 154(b) by 1080 days.

(21) Appl. No.: 10/335,813

(22) Filed: Jan. 2, 2003

(65) Prior Publication Data

US 2003/0216977 A1    Nov. 20, 2003

(30) Foreign Application Priority Data

May 14, 2002    (JP) .............................. 2002-137922

(51) Int. Cl.
  *G07B 17/00*    (2006.01)
  *G07F 19/00*    (2006.01)
(52) U.S. Cl. .................... 705/30; 705/36 R; 705/38
(58) Field of Classification Search ................ 705/1, 705/30, 36 R, 38
See application file for complete search history.

(56) References Cited

U.S. PATENT DOCUMENTS 5,249,120 A * 9/1993 Foley .............................. 705/1
7,177,834 B1 * 2/2007 Maestle ........................ 705/38

FOREIGN PATENT DOCUMENTS

JP    08329170 A    * 12/1996
JP    09-305677    11/1997

OTHER PUBLICATIONS

A.W. Patrick, Some Observations On The Break-Even Chart The Accounting Review, pp. 573-580.
R.I. Brummet, Overhead Costing, The Costing Of Manufactured Products, 1957.
O. Kubota, Direct Standard Costing Chikurashobou, pp. 145-156, 1965.
David Solomons, Breakeven Analysis Under Absorption Costing The Accounting Review, Jul. 1968, pp. 447-452.

* cited by examiner

*Primary Examiner*—Florian R. Zeender
*Assistant Examiner*—Luna Champagne
(74) *Attorney, Agent, or Firm*—Carrier, Blackman & Associates, PC; William D. Blackman; Joseph P. Carrier

(57) ABSTRACT

An accounting system for an income statement under absorption costing (full costing), with a means for identifying the break even point in a break-even chart, using a 45-degree line, defining $\eta$=the net carryover manufacturing overhead applied in inventories, treating $\eta$ as an additive constant to the other constants in a conventional break-even chart and identifying the break-even point as the intersection between the variable cost line added on the constant line and the 45-degree line. The system further includes a means for identifying the individual break-even point for each individual income statement of manufacturing management accounting departments in the company aiming at the managed gross profit chart previously originated by the applicant; for disclosing the break-even charts for concerned company personnel over a computer information network; and for advisors' advising system to send said break even charts over the information network to company clients.

11 Claims, 4 Drawing Sheets

Manufacturing overhead applied in goods sold

| $A^X(\varepsilon)$ | | |
|---|---|---|
| $A^{X(-)}(\varepsilon)$ | $A^{X(0)}(\varepsilon) = A^{Y(0)}(\varepsilon)$ | $A^{Y(+)}(\varepsilon)$ |
| | $A^Y(\varepsilon)$ | |

Manufacturing overhead applied in goods produced

FIG. 1

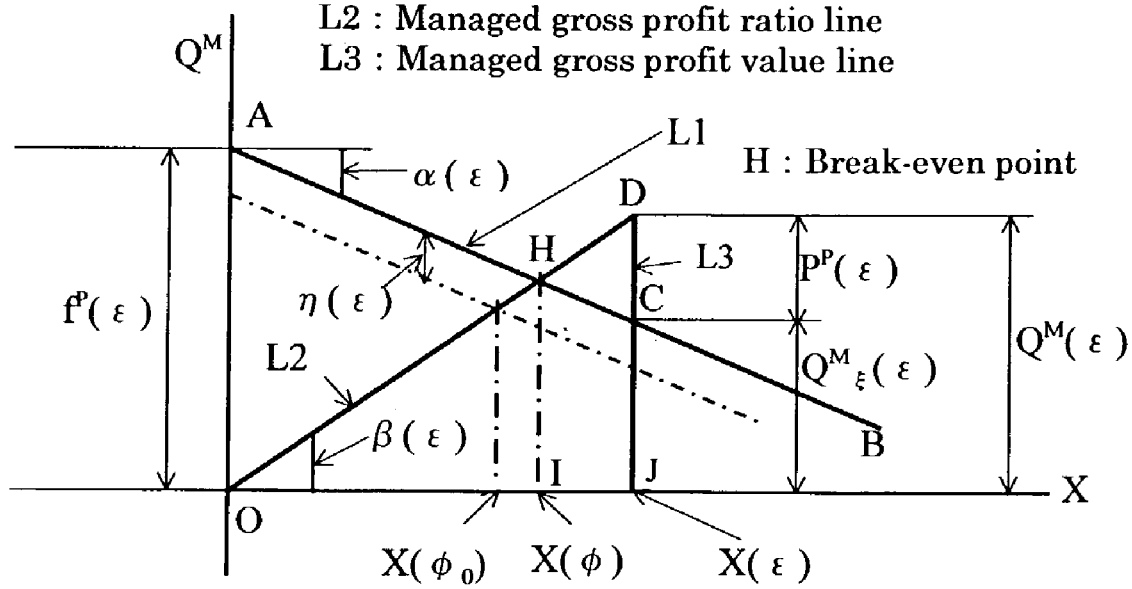

L1 : Marginal managed gross profit line
L2 : Managed gross profit ratio line
L3 : Managed gross profit value line
H : Break-even point Managed gross profit chart

FIG. 2

(a) Break-even line chart (b) Relation between the selling division's profits and the manufacturing idle costs (a) Break-even line chart (b) Managed gross profit chart

ACCOUNTING SYSTEM FOR ABSORPTION COSTING

BACKGROUND OF THE INVENTION

1. Field of the Invention

This invention relates in general to an accounting system of a company which adopts absorption costing, and more particularly, to a system which receives accounting data from clients over computer information networks and makes new profit charts (break-even charts). Each of the new charts corresponds to an individual income statement for each manufacturing direct cost department of the company. The charts are presented to clients over computer information networks.

2. Discussion of Relevant Art

Generally speaking, if only the figures are looked at in income statements, this does not give a person a sensible comprehension for C(cost)-V(volume)-P(profit) relationships, but the relationships can be easily grasped by the same person when they are expressed as charts. In Japan, at the moment only income statements by absorption costing are allowed in published financial statements. In absorption costing, manufacturing overheads are allocated not only to goods sold but also to the inventories. It has caused a great deal of difficulty to get the C-V-P charts in absorption costing.

In 1958, A. W. Patrick presented a paper (Reference [2] in the section of Charting theory grounding the invention) on a break-even line under absorption costing in break-even chart. In this paper, notations were not used in his chart. In 1968, D. Solomons wrote a paper (Reference [5]). The intention of this paper was to present a profit chart in a developed form of A. W. Patrick's chart. Since it was not money amount but goods quantity that was adopted for theoretical treating for both sales and production in their papers, the applicability for practical accountings was not realized. Therefore, there are no profit chart theories applicable to practical accounting in absorption costing now existing in the world, except the managed gross profit chart theory presented in the prior Japanese laid open patent (Reference [1]) that was made by this applicant in 1997.

In Reference [1], an equation for the break-even sales in absorption costing was introduced. At that time, a comparison between the applicant's theory and Solomons' theory was not discussed. In the following application the equations of both the applicant and D. Solomons will be examined and discussed to show the differences and to explain why those differences exist.

With the increasing complexity in management activities of companies, a change from centralization to decentralization, namely a business division system has been seen in their management organization systems. Decentralization in a company means the transferring of both authority and responsibility from the head division to the other individual business divisions. Due to this, an intra-company transfer price system is prepared, and internal transactions are carried out among the business divisions.

Although the management accounting is carried out both in direct costing and absorption costing, direct costing has an advantage over absorption costing in management fields. The reason is that C-V-P relationships can be expressed as a C-V-P chart (marginal profit graph), and this chart is connected with profit planning. However, the applicant points out that the profit to be aimed at by a company's business division should not be the profit under direct costing but, if possible, under absorption costing. The reason for this is that companies always look for the profit in published financial statements. However, up till now management accounting profit charts in absorption costing in business division systems have not been utilized because of the defectiveness in the conventional charting theory for absorption costing.

If a company is considered that is an orders-received-business company and that adopts job order costing and a business division system, the management accounting system for such a company can be broken down into several management accounting departments per one company: (1) several manufacturing direct cost departments, that aim at controlling the manufacturing direct costs, (2) several manufacturing indirect cost departments, that aim at controlling the manufacturing overheads, (3) a department for selling and general administrative expenses, (4) the other departments composed of a non-operating expense department, an extraordinary profit and loss department, and an asset department excluding inventories, (5) a profit and loss summary department.

If there is a reasonable distribution on the expenses from the departments (2), (3), and (4) to the department (1), then all the expenses will be broken down to the separate units of the direct cost department (1). Hereinafter, "a business division system" means the management accounting system under absorption costing; the accounting is possible to get each income before taxes of each manufacturing direct cost department unit mentioned above without leaving the cost variances of the indirect cost departments.

To show a profit per each manufacturing direct cost department for whole amount of profit of a company is same as to completely break down whole costs (or expenses) of goods sold to the department. By the applicant's managed gross profit theory, charting an income statement in absorption costing is possible. However, in Reference [1], a charting theory for an operating income in an income statement per one company was presented, but the theory of how to break down the income into each income per each business division was not presented. For this reason, it has been desired, for the managed gross profit theory, to develop itself applicable to practical accountings.

In the world at the moment, people within companies increasingly utilize methods of sending electronic image pictures to company insiders or outsiders with personal computers through intranets or over the internet. However, from the theory background mentioned above, the business accounts have now no method of utilizing profit charts for income statements under absorption costing in spite of the needs of disclosure by image pictures.

SUMMARY OF THE INVENTION

In order to provide businesses aiming at utilizing the profit charts for income statements under absorption costing, there are problems that need to be solved such as: (1) seeking theoretical completion of a charting theory that can bear practical accountings and that is suitable for income statements in the business division system under absorption costing, (2) providing new business methods utilizing the internet or intranets after the theoretical completion.

In Reference [1], the operating income was the object that was being studied. However, profits are classified in various groups as: gross profit, managed gross profit, operating income, managed operating income, recurring profit, income before taxes, and net income after taxes. Consequently, there is a problem how to show graphic expressions that are appropriate to the above-mentioned various groups in compliance with purposes of profit management.

When making an income statement in a practical accounting work, it is possible that there is an allocation of manufacturing overheads applied or intra-company transfer prices between indirect cost departments. It is also possible that there is an allocation of the said costs between an indirect cost department and the extraordinary profit and loss account or the asset account excluding inventories. These problems should be resolved in the practical accounting.

The purpose of charting an income statement under absorption costing is to give a better understanding of cost-volume-profit relationships with inventories included by using a method that is appealing to human senses. The best way of appealing to human senses is a presentation of picture image by use of personal computers, and company managers can present graphic pictures to employers or outsiders over computer information networks such as LANs, intranets and the internet. In addition, it is very useful as a business tool for corporate accountants and business consultants, who want to give pictures of profit charts to customers through networks.

The accounting system to solve the said problems includes a method of drawing a break-even chart, expressed using a 45-degree line for an income statement in absorption costing (full costing) by the use of computer calculations, comprising the steps of:

applying to an income statement of a company which adopts absorption costing including full standard costing, or costing based on an intra-company transfer price system, setting up rectangular coordinates, with a horizontal axis as sales X and a vertical axis as sales (cost+profit), defining; η=net carryover manufacturing overhead applied in inventories=manufacturing overhead applied in year-beginning inventory−manufacturing overhead applied in year-end inventory, treating C+G+η as fixed costs where C=manufacturing overhead (actual) and G=selling and general administrative expenses (actual), drawing a fixed-cost line parallel to X-axis, treating manufacturing direct cost in goods sold (actual) $D^X$ as a variable cost, drawing a variable-cost line increasing to the right through the intersection of the vertical axis with the said fixed-cost line, drawing a 45-degree line increasing to the right through the origin, considering that the intersection of the variable-cost line with the 45-degree line being the break-even point for the operating income in the income statement under absorption costing.

In addition, the accounting system includes a method of breaking down an income statement (for income before taxes), per one company into an individual income statement for each manufacturing direct cost department, providing each departmental income chart (referred to as a "managed gross profit chart"), and drawing the managed gross profit chart for each of the income statement in absorption costing by the use of computer calculations, comprising the steps of:

applying to a company adopting said absorption costing, and having a management accounting system comprising of several manufacturing direct cost departments (m=m1, m2, . . . , mn), several manufacturing indirect cost departments (c=c1, c2, . . . , cn), a selling and general administrative expenses department (g), a non-operating expense department (u) and an extraordinary profit and loss department (s), indicating symbols per one company as: X=sales, $D^X$=manufacturing direct cost in goods sold (actual, variable), $C^F$=manufacturing overhead (actual, fixed), $A^X$=manufacturing overhead applied for goods sold, η=said net carryover manufacturing overhead applied in inventories, G=$G^F$=selling and general administrative expenses (assumed as fixed cost), U=non-operating expense (minus revenue), S=extraordinary loss (minus profit), $A^R$=applied manufacturing overhead apportioned to any asset except inventories, $P^T$=income before taxes, defining as: $E^X=D^X+A^X$=full manufacturing cost, $Q^M$=X−$E^X$=managed gross profit, $f^T$=η+$C^F$+$G^F$+U+S−$A^R$=managed fixed cost, setting up a rectangular coordinates with X-axis horizontal and $Q^M$-axis vertical, utilizing the idea, shown by the applicant, that the income statement can be transformed into an income statement in which the term [$f^T+P^T$] is located at debit and the term [$Q^M+A^X$] is located at credit, breaking down $f^T$ into each individual mi-department expense, by using a proper breakdown basis for $f^T$ by use of computer calculations, breaking down [$Q^M+A^X$] into each [$Q^M_{mi}+A^X_{mi}$] and $p^T$ into each $P^T_{mi}$, converting the income statement of mi-department to the account form in which [$f^T_{mi}+P^T_{mi}$] is located at debit and [$Q^M_{mi}+A^X_{mi}$] is located at credit, drawing a line L1 which starts at the intercept $f^T_{mi}$ on the vertical axis and has a slope of $A^X_{mi}/X_{mi}$, which declines to the right, drawing an inclined line L2 passing through the origin (0, 0) and the point ($X_{mi}$, $Q^M_{mi}$), drawing a vertical line L3 from the point ($X_{mi}$, 0) to the point ($X_{mi}$, $Q^M_{mi}$), equating $P^T_{mi}$ with the difference between the line L1 and the line L2 on the line L3, considering the intersection of the line L1 with the line L2 corresponding to the break-even point for each mi-department income statement in absorption costing.

BRIEF DESCRIPTION OF THE DRAWINGS

FIG. 1 illustrates Eq.(1) in the section of Charting theory grounding the invention.

FIG. 2 shows the managed gross profit chart per one company presented by the applicant.

DETAILED DESCRIPTION OF THE PREFERRED EMBODIMENTS

Figure 3:
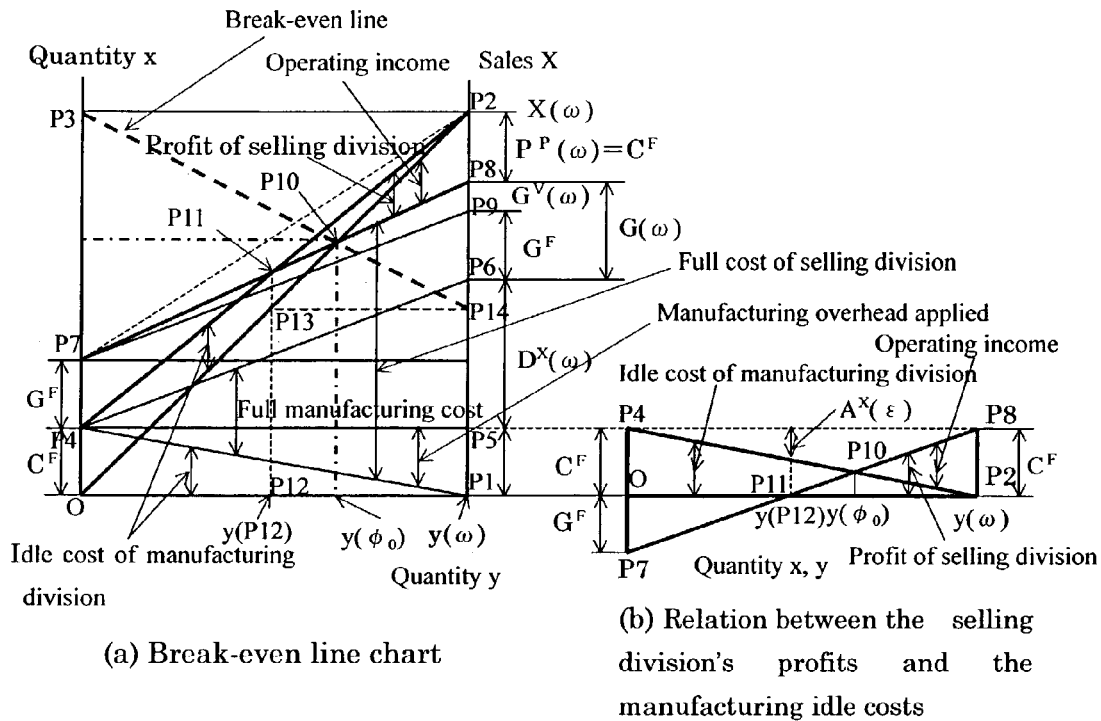
FIG. 3(a) illustrates the break-even line theory studied by the pioneers.
FIG. 3(b) illustrates the relationship between the selling division's profits and the manufacturing idle costs(Under-absorbed fixed manufacturing expenses) in the manufacturing division.

1. Means for Solving the Problems on Profit Chart Theories

Profit chart theories (C-V-P charts for absorption costing) constructed using notations can be found in only two of the References: [1] by the applicant, [5] by D. Solomons. In the two theories, the two break-even sales equations in absorption costing differ from each other. Then, a comparison is attempted between the two equations by use of the same notations, and the meaning of the two equations is explored. This results in the applicant's equation being proved correct.

In the theory of absorption costing, the following two pair of concepts always appear: (a) sales quantity (number of sales goods units) and production quantity (number of production goods units) in the fiscal period, or (b) year-beginning and year-end inventories in the period. The reason why Solomons' theory including Patrick's theory has not been used in both practical accountings and profit managements as practical methods is that they made up their theories with quantity of goods (number of goods units) as a representative variable of goods units. In practical accountings, amount of money is used as goods units rather than goods quantity. Consequently, theories using goods quantity would be unusable in practical accountings, if the theories were right. In addition, D. Solomons and A. W. Patrick used both sales quantity and production quantity as the two independent variables in one chart, and so the charts are too difficult for practical accountants to understand the meaning of the charts.

In order to avoid the weaknesses in the preceding theories, the applicant constructed his theory by adding original ideas: (1) he does not use goods quantity but only the amount of money, namely figures that are written in the income statements, (2) he uses only sales for the horizontal axis in the chart, (3) he simplifies the chart expression by confining the two applied manufacturing overheads in year-beginning and year-end inventories to one parameter $\eta$, which has been called the "net carryover manufacturing overhead in inventories".

The procedure of transforming an income statement to the corresponding operating income chart per one company has already been obtained in Reference [1]. In making a profit chart, the constant term, the numerator term, in the break-even point formula under absorption costing plays an important role; the constant term corresponds to the fixed cost term, namely the numerator in the conventional break-even sales formula, and that has been named the "managed fixed cost" in this specification.

When several manufacturing indirect cost departments exist, all of the end departments to which manufacturing overheads are allocated should be explored, and an income statement before income taxes for one company will be made by taking account of the end departments. This income statement is converted to an income statement in another form that is suitable for charting. The managed fixed costs in the converted statement are rationally broken down to costs per each manufacturing direct cost department using a new breakdown basis.

2. Charting Theory Grounding the Invention

The managed gross profit theory is disclosed in Reference [1] at the beginning stage of constructing the theory. The main points of the theory will be described below, and the applicant has added further theoretical development to the Reference [1].

Cost accounting words such as manufacturing direct cost department, manufacturing indirect cost department, and so forth, are used in this specification, because cost accounting has been developed centering around manufacturing businesses and the words have been so defined as to be suitable for the businesses. Moreover, the applicant has described a job-ordered business company with job order costing as a modeled company. This is because that this type of company is the easiest type for explaining the theory. However, this invention can also be applied to all the companies where the concept of managed gross profit becomes useful for cost or profit management.

In this specification, manufacturing departments are also simply divided into both manufacturing direct cost departments dealing with manufacturing direct costs and manufacturing indirect cost departments dealing with manufacturing overheads in spite of actual, departmental organizations. This has been done, so as to show that manufacturing costs=manufacturing direct costs+manufacturing indirect costs. Furthermore, the income before taxes is aimed at in this description. This has been done for the convenience of descriptions, and this invention can be applied to a net income after income taxes, cash dividends paid and bonuses to directors.

In Reference [1], the manufacturing overhead was named as "the 1st kind of manufacturing overhead" which is where manufacturing overheads applied are variable to sales (manufacturing overheads applied are proportional or semi-proportional to sales), and as for "the 2nd kind of manufacturing overhead" in the case where they are fixed to sales (their costs applied are fixed or semi-fixed to sales). In the Reference, the theory was constructed in such a manner that the said two kinds of manufacturing overheads were reserved. In this specification, for convenience of understanding, the theoretical development is done under the assumption that the 2nd kind of manufacturing overhead does not exist, but this invention includes the case where the 2nd kind of manufacturing overhead exists.

The symbol X denotes sales. It can be the case that in a break-even analysis the sales (amount of money) do not necessarily mean the figures (amount of money) on a final statement. When this occurs, the symbol ($\epsilon$) has been added to any symbol when the symbol means a figure on a final statement. The symbol ($\epsilon$) is taken off when the original symbol represents a coordinate axis. The symbol (X) is added to a symbol when the symbol is the function of X.

The superscript X denotes that costs refer to current sales including year-beginning inventories during the fiscal period, and the superscript Y denotes that costs refer to current production including year-end inventories of the period. When looking at the quantity of goods, namely the number of goods, it is the case that the sales and production need to be compared at the same time. To do this, the small character x denotes the quantity of goods sold, and y is used to the quantity of goods produced.

The following symbols are used.

D=Manufacturing direct cost (actual, variable cost)

$C^F$=Manufacturing overhead (actual, fixed cost)

A=Manufacturing overhead applied $\delta$=Cost variance of manufacturing indirect cost department G=Selling and general administrative expenses (actual) =$G^F$ (fixed costs)+$G^V$ (variable costs)

E=Full manufacturing cost

Q=Gross profit on sales $Q^M$=Managed gross profit $P^M$=Managed operating income $P^P$=Operating income on sales The income statement for an operating income is shown in Table 1.

TABLE 1

| Items | Debit | Credit |
|---|---|---|
| Sales | | $X(\epsilon)$ |
| Manufacturing direct cost(actual) | $D^X(\epsilon)$ | |
| Manufacturing overhead applied in goods sold | $A^X(\epsilon)$ | |
| Manufacturing overhead(actual) | $C^F(\epsilon)$ | |
| Manufacturing overhead applied in goods produced | | $A^Y(\epsilon)$ |
| Selling and general administrative expenses | $G(\epsilon)$ | |
| Operating income | $P^P(\epsilon)$ | |

The superscripts (−) and (+) represent the costs incurred belonging to the year-beginning inventories and the year-end inventories respectively in a fiscal period. The superscript (0) expresses the costs incurred, which do not belong to the inventories in the fiscal period. The result is that $A^X=A^{X(-)}+A^{X(0)}$, $A^Y=A^{Y(0)}+A^{Y(+)}$, $D^X=D^{X(-)}+D^{(0)}$, $D^Y=D^Y_{(0)}+D^{Y(+)}$, $E^X=E^{X(-)}+E^{X(0)}$. The net carryover manufacturing overhead applied in the inventories is denoted by the symbol η. It is assumed that the manufacturing overheads are allocated only to the goods sold and the inventories.

By using the above-mentioned notations, the relationship between the notations can be expressed as follows.

$$A^X(\epsilon)=A^{X(-)}(\epsilon)+A^Y(\epsilon)-A^{Y(+)}(\epsilon) \quad (1)$$

$$\eta(\epsilon)=A^{X(-)}(\epsilon)-A^{Y(+)}(\epsilon)=A^X(\epsilon)-A^Y(\epsilon) \quad (2)$$

$$E^X(\epsilon)=D^X(\epsilon)+A^X(\epsilon) \quad (3)$$

$$Q^M(\epsilon)=X(\epsilon)-E^X(\epsilon) \quad (4)$$

$$\delta(\epsilon)=C^F(\epsilon)-A^Y(\epsilon) \quad (5)$$

$$Q(\epsilon)=Q^M(\epsilon)-\delta(\epsilon) \quad (6)$$

$$P^P(\epsilon)=Q(\epsilon)-G(\epsilon) \quad (7)$$

From Eq.(1)–Eq.(7), $P^P(\epsilon)$ is derived as follows.

$$P^P(\epsilon)=Q^M(\epsilon)+A^X(\epsilon)-\eta(\epsilon)-C^F(\epsilon)-G(\epsilon) \quad (8)$$

For convenience of explanation, an orders-received-business company under job order costing is discussed. In the company, daily management activities are generally implemented through the following cost or profit controls. At the manufacturing direct cost department, $Q^M(\epsilon)$ is controlled. At the manufacturing indirect cost department, $\delta(\epsilon)$ is controlled. At the selling and general administrative expenses department, $P^M(\epsilon)(=Q^M(\epsilon)-G(\epsilon))$ is controlled, where $P^M(\epsilon)$ is the profit of the selling and general administrative expenses department when the departmental internal purchases are taken to be equal to $E^X(\epsilon)$ and in this specification the profit is called "managed operating income". At the profit and loss summary department, $P^P(\epsilon)(=P^M(\epsilon)-\delta(\epsilon))$ is controlled. The reason of this process is that the estimation of $\delta(\epsilon)$ is very difficult during the fiscal period in orders-received-business companies.

These management activities are shown in Table 2(a), Table 2(b), Table 2(c), and Table 2(d).

TABLE 2

| (a) Manufacturing direct cost department | | (b) Manufacturing indirect cost department | |
|---|---|---|---|
| Debit | Credit | Debit | Credit |
| $E^X(\epsilon)$ | $X(\epsilon)$ | $C^F(\epsilon)$ | $A^Y(\epsilon)$ |
| $Q^M(\epsilon)$ | | | $\delta(\epsilon)$ |

| (c) Selling and general administrative department | | (d) Profit and loss summary department | |
|---|---|---|---|
| Debit | Credit | Debit | Credit |
| $G(\epsilon)$ | $Q^{M(\epsilon)}$ | $\delta(\epsilon)$ | $P^M(\epsilon)$ |
| $P^M(\epsilon)$ | | $P^P(\epsilon)$ | |

Although the real state of the orders-received-business company's management activities under absorption costing is in the above-mentioned description, both profits $Q^M$ and $P^M$ have been given little attention, so that there are no formal terms for these symbols. Accordingly, the applicant has named them temporarily $Q^M$ "managed gross profit", $P^M$ "managed operating income".

If the symbols $\alpha(\epsilon)$ and $f^P(\epsilon)$ are defined as shown in Eq.(9) and Eq.(10) respectively, Eq.(8) is converted to Eq.(11).

$$\alpha(\epsilon)=(A^X(\epsilon)-G^Y(\epsilon))/X(\epsilon) \quad (9)$$

$$f^P(\epsilon)=\eta(\epsilon)+C^F(\epsilon)+G^F(\epsilon) \quad (10)$$

$$P^P(\epsilon)=Q^M(\epsilon)+\alpha(\epsilon)\cdot X(\epsilon)-f^P(\epsilon) \quad (11)$$

The marginal condition of $Q^M(\epsilon)$ in Eq.(11) occurs when $P^P(\epsilon)=0$, under this state $Q^M(\epsilon)$ is represented as $Q^M_\xi(\epsilon)$ with subscript ξ. Thus $Q^M_\xi(\epsilon)$ can be given by Eq.(12) or Eq.(13).

$$Q^M_\xi(\epsilon)=f^P(\epsilon)-\alpha(\epsilon)\cdot X(\epsilon) \quad (12)$$

$$Q^M_\xi(\epsilon)=G(\epsilon)+\delta(\epsilon) \quad (13)$$

Equation (12) can be changed to become:

$$Q^M_\xi(\epsilon)/f^P(\epsilon)+X(\epsilon)/(f^P(\epsilon)/\alpha(\epsilon))=1 \quad (14)$$

Also $P^P(\epsilon)$ is represented as follows.

$$P^P(\epsilon)=Q^M(\epsilon)-Q^M_\xi(\epsilon) \quad (15)$$

Set up the rectangular coordinates, with the sales X on the horizontal axis, and the managed gross profit $Q^M$ on the vertical axis as shown in FIG. 2. If it is observed that Eq.(14) is satisfied at $X=X(\epsilon)$, this tells that the point $(X(\epsilon), Q^M(\epsilon))$ on the coordinates $(X, Q^M)$ is located on the line shown in Eq.(16); it is the line AB in FIG. 2 with the $Q^M$-intercept $f^P(\epsilon)$ (or the segment OA) and with the slope—$\alpha(\epsilon)$.

$$Q^M/f^P(\epsilon)+X/(f^P(\epsilon)/\alpha(\epsilon))=1 \quad (16)$$

Equation (13) shows that $Q^M_\xi(\epsilon)$ consists of both $G(\epsilon)$ and $\delta(\epsilon)$ at $X=X(\epsilon)$. Later descriptions will show that $\delta(\epsilon)$ corresponds to the idle costs at the manufacturing indirect cost departments. Thus $Q^M_\xi(\epsilon)$ means the marginal costs that equal the operating income zero taking account of the existence of inventories. Accordingly, Eq.(16) is referred to as the "marginal-managed-gross-profit line" in this specification.

The managed gross profit $Q^M(\epsilon)$, from Eq.(4), is given as the ordinate at $X=X(\epsilon)$ on the line of Eq.(17), namely the segment OD in FIG. 2.

$$Q^M = \beta(\epsilon) \cdot X \qquad (17)$$

$$\beta(\epsilon) = Q^M(\epsilon)/X(\epsilon) \qquad (18)$$

Since $\beta(\epsilon)$ shows the ratio of $Q^M(\epsilon)$ to $X(\epsilon)$, Eq.(17) is referred to as the "managed-gross-profit ratio line". The segment JD is the managed gross profit itself, so that it is referred to as the "managed-gross-profit line", and FIG. 2 is referred to as the "managed gross profit chart" in this specification.

Substituting Eq.(2), Eq.(3), and Eq.(4) into Table 1 by use of Eq.(10) transforms Table 1 into Table 3, so that FIG. 2 has an equivalent relation to Table 3.

TABLE 3

| Items | Debit | Credit |
|---|---|---|
| Managed gross profit | | $Q^M(\epsilon)$ |
| Manufacturing overhead applied in goods sold | | $A^X(\epsilon)$ |
| Managed fixed cost | $f^P(\epsilon)$ | |
| Operating income | $P^P(\epsilon)$ | |

Since the line L1 is the marginal line giving zero profits and the line L2 is the one giving profits in FIG. 2, the cross point H of the two lines means the break-even point.

When the break-even sales (the segment OI in FIG. 2) are denoted by $X(\phi)$, then $X(\phi)$ is obtained from simultaneously solving the linear equations (16) and (17), and it is as follows.

$$X(\phi)/X(\epsilon) = f^P(\epsilon)/(X(\epsilon) - D^X(\epsilon) - G^V(\epsilon)) \qquad (19)$$

The break-even managed gross profit $Q^M(\phi)$ is obtained by substituting $X=X(\phi)$ into Eq.(17). The symbol $f^P(\epsilon)$ in Eq.(19) is the value of the segment OA in FIG. 2, and it performs the role of fixed costs in the break-even sales equation under absorption costing. Then it shall be called the "managed fixed cost" in this specification.

The break-even sales for direct costing are obtained by making $\eta(\epsilon) = 0$ in Eq.(19), and this is as follows.

$$X(\phi_0)/X(\epsilon) = f^P_0(\epsilon)/(X(\epsilon) - D^X(\epsilon) - G^V(\epsilon)) \qquad (20)$$

$$f^P_0(\epsilon) = C^F(\epsilon) + G^F(\epsilon) \qquad (21)$$

In absorption costing, classifying $C(\epsilon)$ and $G(\epsilon)$ into fixed costs or variable costs is not usually performed, so $C(\epsilon)$ and $G(\epsilon)$ are regarded as fixed costs as a result. If it is drawn the gross profit chart assuming that $C^V(\epsilon)=0$, $C(\epsilon)=C^F(\epsilon)$, $G^V(\epsilon)=0$ and $G(\epsilon)=G^F(\epsilon)$, important problems will not occur in practical businesses in the situation that $C(\epsilon)$ and $G(\epsilon)$ are regarded as fixed costs. The reason is that $C(\epsilon)$ and $G(\epsilon)$ have fixed or semi-fixed properties in nature. At a terminal date, the position of $X(\phi)$ is located near the position of $X(\epsilon)$ when $P^P(\epsilon) \approx 0$. When the value of $P^P(\epsilon)$ is large (plus side or minus side) at the terminal date, the position of break-even sales is influenced by $C^V(\epsilon)$ or $G^V(\epsilon)$, but the influence is little because of the distance between the positions $X(\phi)$ and $X(\epsilon)$.

When the values of $C^F(\epsilon)$ and $C^V(\epsilon)$ are known, and when it is needed to know the influence of the two terms in the break-even equation, $C^F(\epsilon)$ may be put at the numerator, $C^V(\epsilon)$ at the denominator, in Eq.(19). Hence, an approximate chart under direct costing will be given when $\eta(\epsilon)=0$ and $C^V(\epsilon) \neq 0$ in the managed gross profit chart, but the complete profit chart under direct costing will be given, if $\eta(\epsilon) = C^V(\epsilon) = G^V(\epsilon) = 0$.

In this specification, the break-even sales under absorption costing are given as the numerical equation, and in practical accounting the intersection of the line L1 with the line L2 is calculated by a computer as a solution of the simultaneous linear equations (16) and (17).

For the most part, the foregoing descriptions were disclosed in Reference [1], though the derivation of the break-even equation in that Reference was different from this specification. The descriptions in the next paragraph are a new theory developed by the applicant.

In 1968, D. Solomos carried out a study attempting to derive the break-even sales equation under absorption costing. Though he admitted the validity of A. W. Patrick's "break-even line" problem, he was able to show a deficiency in A. W. Patrick's break-even line chart. He pointed out that the break-even line chart was based on an illustrative set of figures and the chart was computed using these figures and put on to the diagram. Then he formulated a break-even sales formula under absorption costing with symbols, and explained the meaning of the formula using his profit chart.

By D. Solomons' original paper, the break-even sales formula under absorption costing is given as follows:

$$Q_{sb(a)} = \{(Q_C - Q_p) \cdot F_m/Q_c + F_s\}/(p - v_s - v_m - F_m/Q_c) \qquad (22)$$

where
$Q_{sb(a)}$ = Sales quantity at break-even sales under absorption costing
$F_m$ = Total manufacturing fixed expense
$F_s$ = Total selling and administrative fixed expense
$v_m$ = Variable manufacturing cost per unit sold
$v_s$ = Variable selling cost per unit sold
p = Selling price per unit
$Q_s$ = Sales quantity (actual)
$Q_p$ = Production quantity (actual)
$Q_c$ = Production quantity at capacity.

The following transformation of the symbols has been made in Eq.(22) in order to compare it with the applicant's Eq.(19). Thus Eq.(22) becomes Eq.(23).

$$X(\epsilon) = Q_s \cdot p,\ X(\phi) = Q_{sb(a)} \cdot p,\ D^X(\epsilon) = v_m \cdot Q_s,\ G^F(\epsilon) = F_s,$$
$$G^V(\epsilon) = v_s \cdot Q_s,\ C_F(\epsilon) = F_m,\ A^X(\epsilon) = (F_m/Q_c) \cdot Q_s,$$
$$A^Y(\epsilon) = (F_m/Q_c) \cdot Q_p, X(\phi)X(\epsilon) = (-A^Y(\epsilon) + C^F(\epsilon) + G^F$$
$$(\epsilon))/(X(\epsilon) - G^V(\epsilon) - D^X(\epsilon) - A^X(\epsilon)) \qquad (23)$$

Equation (23) differs from the applicant's Eq.(19). A profit equation for Eq.(23) can be obtained by taking the numerator from the denominator in Eq.(23), and the resulting $P^P(\epsilon)$ obtained equals Eq.(8)(once the terms in Eq.(2), Eq.(3), and Eq.(4) have been substituted into it). Thus the same break-even sales formulated should be obtained from the same profit equations. However, the two break-even sales are not the same.

The applicant's theory will be compared with D. Solomons' theory by applying them to the income statement shown in Table 4.

TABLE 4

| Items | Debit | Credit |
|---|---|---|
| $X(\epsilon)$ | | 1,000 |
| $D^X(\epsilon)$ | 700 | |
| $A^X(\epsilon)$ | 180 | |
| $C^F(\epsilon)$ | 190 | |
| $A^Y(\epsilon)$ | | 205 |

TABLE 4-continued

| Items | Debit | Credit |
|---|---|---|
| $G^F(\epsilon)$ | 85 | |
| $P^P(\epsilon)$ | 50 | |

Assume $G^V(\epsilon) = 0$ for simplicity.
$A^{X(-)}(\epsilon) = 25$
$A^{X(0)}(\epsilon) = 180 - 25 = 155$
$A^{Y(+)}(\epsilon) = 205 - 155 = 50$
$\eta(\epsilon) = 25 - 50 = -25$ By applying the applicant's Eq.(19), the break-even sales are as follows.

$$X_{APPLICANT}(\phi) = (25 - 50 + 190 + 85) \cdot 1,000/(1,000 - 700) \quad (24)$$
$$= 833$$

On the other hand, Solomons' break-even sales are obtained from Eq.(23), and are shown as follows.

$$X_{SOLOMONS}(\phi) = (-205 + 190 + 85) \cdot 1,000/(1,000 - 700 - 180) \quad (25)$$
$$= 583$$

Incidentally, the break-even sales $X(\phi_0)$ under direct costing are obtained from Eq.(20), and are as follows.

$$X(\phi_0) = (0 + 190 + 85) \cdot 1,000/(1,000 - 700) \quad (26)$$
$$= 917$$

The income statement corresponding to $X(\phi)_{APPLICANT}$ (=833) is shown in Table 5.

TABLE 5

| Items | Debit | Credit |
|---|---|---|
| $X(\epsilon)$ | | 833 |
| $D^X(\epsilon)$ | 583 | |
| $A^X(\epsilon)$ | 150 | |
| $C^F(\epsilon)$ | 190 | |
| $A^Y(\epsilon)$ | | 175 |
| $G^F(\epsilon)$ | 85 | |
| $P^P(\epsilon)$ | 0 | |

Break-even sales using Eq.(19)
$D^X(\epsilon) = 700 \cdot 833/1,000 = 583$
$A^X(\epsilon) = 180 \cdot 833/1,000 = 150$
$A^{X(-)}(\epsilon) = 25$(the same as in Table 4)
$A^{X(0)}(\epsilon) = 150 - 25 = 125$
$A^{Y(+)}(\epsilon) = 50$(the same as in Table 4)
$A^Y(\epsilon) = 125 + 50 = 175$
$\eta(\epsilon) = 150 - 175 = -25$ (the same as in Table 4)

As shown in this table, $X(\phi)_{APPLICANT}$ is the break-even sales. The sales $X_{SOLOMONS}(\phi)$ (=583) are reasonably not the break-even sales in Table 5. However, $X_{SOLOMONS}(\phi)$ is the break-even sales in Table 6.

TABLE 6

| Items | Debit | Credit |
|---|---|---|
| $X(\epsilon)$ | | 583 |
| $D^X(\epsilon)$ | 408 | |
| $A^X(\epsilon)$ | 105 | |
| $C^F(\epsilon)$ | 190 | |
| $A^Y(\epsilon)$ | | 205 |
| $G^F(\epsilon)$ | 85 | |
| $P^P(\epsilon)$ | 0 | |

Break-even sales using Eq.(23)
$D^X(\epsilon) = 700 \cdot 583/1,000 = 408$
$A^X(\epsilon) = 180 \cdot 583/1,000 = 105$
$A^{X(-)}(\epsilon) = 25$(the same as in Table 4)
$A^{X(0)}(\epsilon) = 105 - 25 = 80$
$A^Y(\epsilon) = 205$(the same as in Table 4)
$A^{Y(+)}(\epsilon) = 205 - 80 = 125$ The difference between Table 5 of the applicant and Table 6 of D. Solomons is as follows. In the process from Table 4 to Table 5, both $A^{X(-)}(\epsilon)$ and $A^{Y(+)}(\epsilon)$ are kept constant, but both $A^X(\epsilon)$ and $A^Y(\epsilon)$ vary keeping $\eta(\epsilon)$ constant. To the contrary, in the process from Table 4 to Table 6, both $A^{X(-)}(\epsilon)$ and $A^Y(\epsilon)$ are kept constant and both $A^X(\epsilon)$ and $A^{Y(+)}(\epsilon)$ vary.

In the case where $A^{X(-)}(\epsilon) = A^{Y(+)}(\epsilon) = $ constants($\neq 0$), the break-even sales can be obtained using the conventional formula $X(\phi) =$ fixed costs/(1−variable cost ratio) when $\eta(\epsilon) = \eta(\phi) = 0$. However, if $A^{X(-)}(\epsilon)$ was a constant and $A^{Y(+)}(y)$ was a variable, the conventional formula itself would not be satisfied.

The managed gross profit theory is consistent with Patrick's theory, but Solomons' theory is not consistent with Patrick's theory. Hereafter this will be verified. The large part of the break-even line theory described below was presented by R. L. Brummet (Reference [3]), and was referred to in Reference [4], where explanations of the theory are given in Japanese. However, in this specification, unit of quantity (number of goods units) is not used but unit of money amount and symbols are used. These symbols are used in order to verify the identity between the managed gross profit theory and the break-even line theory.

Consider a company with two business divisions, namely a manufacturing division and a selling division. In this sample the former sells finished goods internally to the latter at standard prices (=manufacturing direct costs+manufacturing overheads applied), and the latter purchases internally the goods from the former and sells externally the goods.

The symbol ($\omega$) is used to indicate the state where accounting data are at capacity. Within the example consider the income statement to be such that $P^P(\omega) = C^F$, $A^{X(-)}(\omega) = 0$, $A^X(\omega) = C^F$, $A^{Y(+)}(\omega) = 0$, $A^Y(\omega) = C^F$, at sales $X(\omega)$.

The break-even line chart is illustrated in FIG. 3(a), where the horizontal axis expresses quantity of goods produced y, vertical axis quantity of goods sold x corresponding to X. In the manufacturing division, the manufacturing overheads applied are the vertical values of triangle P4-P1-P5, the manufacturing idle costs (Under-absorbed fixed manufacturing expenses) are those of O-P1-P4 (these vertical values equal those of triangle O-P2-P4), and the full manufacturing costs are those of triangle P4-P1-P6. In the selling division, internal purchase costs are the vertical values of triangle P4-P1-P6, sales (or quantity of goods sold) are those of triangle P4-P1-P2 (or O-P1-P2), and the division's full costs are those of the quadrangle P4-P1-P8-P7, so that those of the area enclosed within both the line P4-P2 and line P7-P8 are selling division's profits.

FIG. 3(b) expresses only the relationship between the selling division's profits and the manufacturing idle costs in FIG. 3(a). In FIG. 3(b), the vertical values of triangle O-P2-P4 are the manufacturing idle costs, the difference between the line O-P2 and line P7-P8 is the selling division's profits. When selling division's profits and manufacturing idle costs are offset against each other for any quantity of finished goods sold, the profit of the whole company, namely, the operating income is zero. Break-even line theory means that the relationship between two quantities of goods sold and goods produced gives innumerable combinations in which operating income equals zero, and the combinations make a locus which is the break-even line connecting P3 and P14 in FIG. 3(a).

Figure 4:
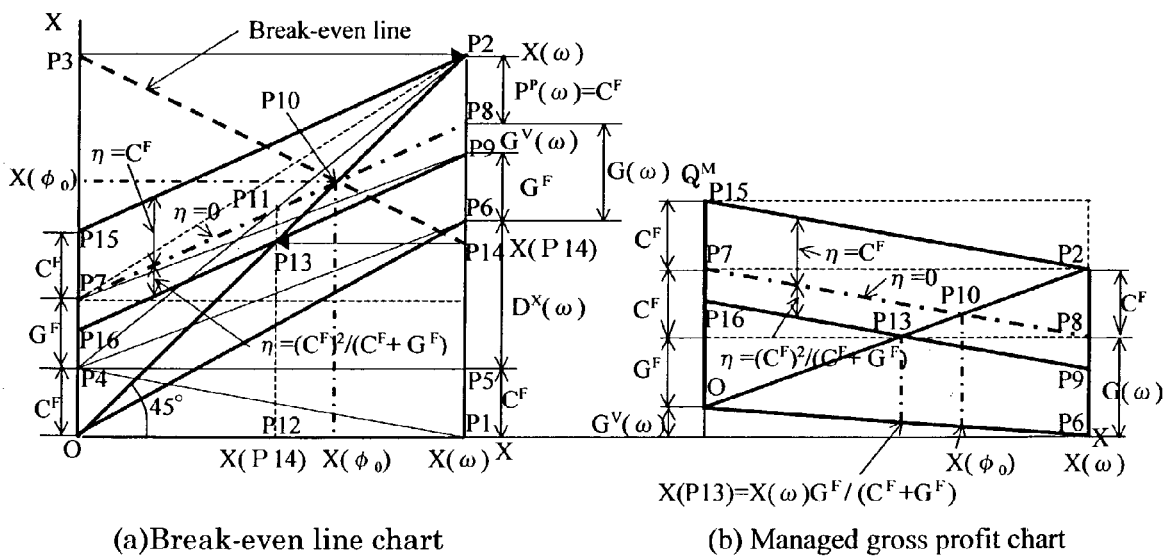
FIG. 4(a) expresses FIG. 3(a) on the conventional 45-degree-line break-even chart.
FIG. 4(b) is a chart where every point on FIG. 4(a) is consistent with points on the managed gross profit chart.

It can be confirmed in the following process that the points on the break-even line correspond to those on the managed-gross-profit ratio line. FIG. 4(a) is such that the horizontal axis-y in FIG. 3(a) is converted to the horizontal axis-X and the values of quantity y are confined in the points P2, P10, P13 in FIG. 4(a). FIG. 4(b) has been taken from the quadrangle of O-P6-P2-P15 in FIG. 4(a) and this figure really corresponds to the managed gross profit chart.

In FIG. 3(a), P3 on the break-even line shows the case where $y(\epsilon)=0$, namely the place where manufacturing idle cost equals $C^F$. In this case, let all of goods sold be year-beginning inventories, and $x(\epsilon)=O-P3=O-P1=y(\omega)$, namely $X(\epsilon)=P1-P2=X(\omega)$. At that sales, $A^X(\epsilon)=A^{X(-)}(\epsilon)=C^F$, and the selling division's profit=P2-P8=$C^F$, so that P3 is a break-even point. It will be shown in the following equations that conditions of P3 in FIG. 3(a) and in FIG. 4(a) are consistent with those of P2 in FIG. 4(a) and in FIG. 4(b).

$y(\epsilon)=0$, $A^Y(\epsilon)=A^{Y(0)}(\epsilon)=A^{Y(+)}(\epsilon)=0$, $D^Y(\epsilon)=0$, $A^{X(-)}(\epsilon)=C^F$, $A^{X(0)}(\epsilon)=0$, $A^X(\epsilon)=C^F$, $D^X(\epsilon)=D^{X(-)}(\omega)$, $X(\epsilon)=X(\omega)=G^F+G^V(\omega)+2C^F+D^{X(-)}(\omega)$, $\eta(\epsilon)(Eq.(2))=C^F$, $f^P(\epsilon)(Eq.(10))=2C^F+G^F$, $E^X(\epsilon)(Eq.(3))=D^{X(-)}(\omega)+C^F$, $Q^M(\epsilon)(Eq.(4))=G^F+G^V(\omega)+C^F$, $\delta(\epsilon)(Eq.(5))=C^F$, $Q^M_\xi(\epsilon)(Eq.(13))=G(\omega)+C^F$, $P^P(\epsilon)(Eq.(15))=0$ The point P10 in FIG. 3(a) is satisfied by the condition in which quantity of goods produced=quantity of goods sold, namely $\eta(\epsilon)=0$, so that P10 in FIG. 3(a) is the break-even point under both direct costing and absorption costing. It will be shown below that conditions of P10 in FIG. 3(a) and in FIG. 4(a) are consistent with those of P10 in FIG. 4(b). It is allowed that $A^{X(-)}(\epsilon)=A^{X(+)}(\epsilon)=D^{X(-)}(\epsilon)=D^{X(+)}(\epsilon)=0$.

$\zeta=(C^F+G^F)/(2 C^F+G^F)=(C^F+G^F)/(X(\omega)-D^X(\omega)-G^V(\omega))$, $X(\phi_0)=\zeta\cdot X(\omega)$, $D^X(\phi_0)=\zeta\cdot D^X(\omega)$, $G^V(\phi_0)=\zeta\cdot G^V(\omega)$ (∵ the relation between triangle P7-P10-P4 and triangle P8-P10-P2), $A^X(\phi_0)=A^Y(\phi_0)=\zeta\cdot C^F$, $E^X(\phi_0)(Eq.(3))=\zeta\cdot(D^X(\omega)+C^F)$, $Q^M(\phi_0)(Eq.(4))=\zeta\cdot(X(\omega)-D^X(\omega)-C^F)=\zeta\cdot(C^F+G(\omega))$, $\delta(\phi_0)(Eq.(5))=C^F\cdot(1-\zeta)$, $Q^M_v(\phi_0)(Eq.(13))=G(\phi_0)+C^F\cdot(1-\zeta)=G^F+\zeta\cdot G^V(\omega)+C^F\cdot(1-\zeta)=(C^F+G^F)(1+(G^V(\omega)-C^F)/(2C^F+G^F))=\zeta\cdot(C^F+G^F+G^V(\omega))=Q^M(\phi_0)$, $P^P(\epsilon)$ (Eq.(15))=0, $f^P(\epsilon)$ (Eq.(10))=$C^F+G^F$.

The point P14 in FIG. 3(a) is placed at capacity, where the manufacturing idle cost equals zero and $y(\epsilon)=y(\omega)$. If $x(\epsilon)=$O-P11 in FIG. 3(b), namely $x(\epsilon)=$O-P12 in FIG. 3(a), the selling division's profit equals zero, so that P14 with $X(\epsilon)=$P1-P14 (=P12-P13) and $y(\epsilon)=y(\omega)$, is a break-even point.

It will be shown below that conditions of P14 in FIG. 4(a) are consistent with those of P13 in FIG. 4(a) and in FIG. 4(b).

$A^{X(-)}(\epsilon)=0$, $A^X(\epsilon)=A^{X(0)}(\epsilon)=A^{Y(0)}(\epsilon)=C^F\cdot G^F/(C^F+G^F)$ (∵$A^X(\epsilon)=C^F\cdot$O-P11/P4-P8=$C^F\cdot$O-P7/P4-P7 in FIG. 3(b)), $A^Y(\epsilon)=C^F$, $A^{Y(+)}(\epsilon)=A^Y(\epsilon)-A^{Y(0)}(\epsilon)=(C^F)^2/(C^F+G^F)$, $X(\epsilon)=$sales of $x$(P12-P13)=$X$(P1-P14)=$X(\omega)\cdot G^F/(C^F+G^F)(\because X(\epsilon)/X(\omega)=A^X(\epsilon)/C^F)$, $\eta(\epsilon)(Eq.(2))=-(C^F)^2/(C^F+G^F)$, $D^X(\epsilon)=D^X(\omega)\cdot G^F/(C^F+G^F)(\because$ ratio of $X(\epsilon)/X(\omega))$, $G^V(\epsilon)=G^V(\omega)\cdot G^F/(C^F+G^F)(\because$ ratio of $X(\epsilon)/X(\omega))$, $E^X(\epsilon)(Eq.(3))=G^F\cdot(D^X(\omega)+C^F)/(C^F+G^F)$, $Q^M(\epsilon)(Eq.(4))=G^F\cdot(X(\omega))-D^X(\omega)-C^F)/(C^F+G^F)=G^F\cdot(C^F+G(\omega))/(C^F+G^F)=G^F+G^F\cdot G^V(\omega)/(C^F+G^F)=G^F+G^V(\epsilon)(\because G^V(\epsilon)/G^V(\omega)=$O-P11/P4-P8=$G^F/(C^F+G^F))$, $\delta(\epsilon)$ (Eq.(5))=0, $Q^M_\xi(\epsilon)(Eq.(13))=G^F+G^V(\epsilon)$, $P^P(\epsilon)(Eq.(15))=0$. Q.E.D.

Through this proof, the selling division's profit by A. W. Patrick and R. L. Brummet corresponds to $P^M(\epsilon)$, and the manufacturing idle cost does to $\delta(\epsilon)$.

This shows that the managed gross profit theory is completely consistent with the theories that are the conventional theory when $\eta(\epsilon)=0$, and the break-even line theories including Patrick's theory and Brummet's theory. Consequently, the applicant's Eq.(19) is correct and Solomons' Eq.(23) is wrong for the break-even point equation. When D. Solomons derived his equation he based it on the fact that Patrick's theory was correct. However, D. Solomons made a mistake in the process of deriving his equation and the result gave the break-even point shown in Table 6.

The way of deriving the break-even sales equation according to D. Solomons' notations is as follows. Since $P^P(\phi)=0$, $Q^M(\phi)=X(\phi)-(D^X(\phi)+A^X(\phi))$ at $X(\epsilon)=X(\phi)$ in Eq. (8), the following is obtained with D. Solomons' notations.

$$Q_{sb(a)}(p-v_m-v_s)=\eta(\phi)+F_m+F_s \qquad (27)$$

Since, on the other hand, $A^X(\phi)=A^{X(-)}(\epsilon)+A^{X(0)}(\phi)$, $A^Y(\phi)=A^{Y(0)}(\phi)+A^{Y(+)}(\epsilon)$, $A^{X(0)}(\phi)=A^{Y(0)}(\phi)$, so the following is obtained.

$$\eta(\phi)=\eta(\epsilon)=Eq.(2)=(Q_s-Q_p)F_m/Q_C \qquad (28)$$

Consequently, the break-even sales equation should be represented as follows.

$$Q_{sb(a)}=((Q_s-Q_P)F_m/Q_C+F_m+F_s)/(p-v_m-v_s) \qquad (29)$$

FIG. 5 shows again the break-even chart under absorption costing in the form of the conventional 45-degree-line break-even chart. As shown in the chart, it is found that the break-even chart under absorption costing can be obtained only if $\eta(\epsilon)$ is treated as a fixed cost and is added to the conventional fixed costs. By referring to FIG. 5 it is easy to understand the meaning of the break-even line. Consider the income statement which is equivalent to FIG. 5 where both $C^F$ and $G^F$ are fixed costs and the variable cost ratio $(D^X+G^V)/X$ is a constant. What the break-even line exists means that sales $X(\phi)$ always exists as the intersection of the cost line with 45-degree-line for any $\eta(\epsilon)$.

The above-mentioned descriptions have been aimed at constructing a theory for making a profit chart per one company under absorption costing. From the next part, a theory has been constructed that provides a profit chart under absorption costing for an income before taxes of each manufacturing direct cost department when the following accounting departments exist and the following notations are used:

(1) Several manufacturing direct cost departments (m=m1, m2, . . . , mn)

(2) Several manufacturing indirect cost departments (c=c1, c2, . . . , cn), and superscript C expresses internal transactions among these departments (3) A selling and general administrative expenses department (g)
(4) A non-operating expense department (u)
Non-operating expense (minus revenue): U
(5) An extraordinary profit and loss department (s), and superscript S expresses internal transactions between this department and c-department
Extraordinary loss (minus profit): S
(6) An asset department excluding inventories (r), and superscript R expresses internal transactions between this department and c-department Indicate income before taxes by $P^T(\epsilon)$, and profit and loss summary calculation by the symbol z. The reason for taking account of the asset department excluding inventory is that there is such a case where constructors build their own office buildings.

In an intra-company transfer price system, there are cases where internal profits are included and not included in the prices. When internal prices are determined by excluding internal profits, namely those prices are determined under "cost basis", the intra-company transfer price system is the same as the standard costing system in closing process. So to avoid complex descriptions, it is assumed that intra-company transfer price system costing is implied in the term standard costing. Therefore, manufacturing overhead applied, also imply intra-company transfer price cost. Thus the following assumption is made.

Assumption A: The intra-company transfer prices are determined under the standard prices.

None of theoretical problems occur, if the intra-company transfer price system is adopted in a selling and general administrative expenses department. However, the said expenses are period costs rather than product costs, and they are generally distinguished from manufacturing overhead in product cost, so that the following assumption is made for simplicity.

Assumption B: The intra-company transfer price system is not adopted in the selling and general administrative expenses department.

In practical accounting, there is a possibility that complicated internal transactions may occur, in which they are piled up one on top of another among manufacturing indirect cost departments or small sections in one department. Then, for simplicity, the following assumption is made. However, in this case, the last transaction in the internal transactions can be regarded as the only one in Assumption C.

Assumption C: The number of times of allocation is limited to one or zero among manufacturing indirect cost departments or small sections in one department.

The following notations are defined in order to observe how manufacturing overheads applied are distributed. Suppose that a ci-manufacturing indirect cost department provides goods or services to a w-department and receives the value of the applied manufacturing overhead from the w-department. In the case, the applied overhead is denoted by the symbol A with subscripts ci,w like $A_{ci,w}$. In the intra-company transfer price system, $A_{ci,cj}$ means a transfer revenue of the ci-department from the cj-department and, at the same time, it is an expense (cost) of the cj-department applied by the ci-department.

Table 7 is a list that breaks down the total amount of applied manufacturing overheads incurred at every manufacturing indirect cost department.

TABLE 7

| Allocated deps. | c-department | | | |
|---|---|---|---|---|
| | cl | ci | cn | Total |
| m-department | | | | |
| ml | $A^Y_{cl,ml}$ | $A^Y_{ci,ml}$ | $A^Y_{cn,ml}$ | $A^Y$ |
| mj | $A^Y_{cl,mi}$ | $A^Y_{ci,mi}$ | $A^Y_{cn,mi}$ | |
| mn | $A^Y_{cl,mn}$ | $A^Y_{ci,mn}$ | $A^Y_{cn,mn}$ | |
| c-department | | | | |
| cl | $A^C_{cl,cl}$ | $A^C_{ci,cl}$ | $A^C_{cn,cl}$ | $A^C$ $A^H$ |
| cj | $A^C_{cl,ci}$ | $A^C_{ci,ci}$ | $A^C_{cn,ci}$ | |
| cn | $A^C_{cl,cn}$ | $A^C_{ci,cn}$ | $A^C_{cn,cn}$ | |
| SG&A expenses dep. | — | — | — | — |
| Non-operating expense department | — | — | — | — |
| Extraordinary profit and loss department | $A^S_{cl,s}$ | $A^S_{ci,s}$ | $A^S_{cn,s}$ | $A^S$ |
| Other asset department | $A^R_{cl,r}$ | $A^R_{ci,r}$ | $A^R_{cn,r}$ | $A^R$ |

As already mentioned notations, $A^C(\epsilon)$, $A^S(\epsilon)$ and $A^R(\epsilon)$ indicate the applied manufacturing overheads assigned to: the manufacturing indirect cost departments, the extraordinary profit and loss department and the asset department not including inventories, respectively. The symbol $A^H$ means the total of the above-mentioned three costs, and it is shown as follows:

$$A^H(\epsilon) = A^C(\epsilon) + A^S(\epsilon) + A^R(\epsilon) \tag{30}$$

Table 8 shows an income statement for the income before taxes of a company.

TABLE 8

| Items | Debit | Credit |
|---|---|---|
| Sales | | $X(\epsilon)$ |
| Manufacturing direct cost(actual) | $D^X(\epsilon)$ | |
| Manufacturing overhead applied in goods sold | $A^X(\epsilon)$ | |
| Manufacturing overheads | $C^F(\epsilon) + A^C(\epsilon)$ | |
| Total amount of overheads allocated from c department | | $A^Y(\epsilon) + A^H(\epsilon)$ |
| Selling and general administrative expenses | $G(\epsilon)$ | |
| Non-operating expense | $U(\epsilon)$ | |
| Extraordinary losses(minus profits) | $S(\epsilon) + A^S(\epsilon)$ | |
| Income before taxes | $P^T(\epsilon)$ | |

Substituting equations (1), (2), (3) and (4) into Table 8 gives Table 9.

TABLE 9

| Items | Debit | Credit |
|---|---|---|
| Managed gross profit | | $Q^M(\epsilon)$ |
| Manufacturing overhead applied in goods sold | | $A^X(\epsilon)$ |
| Managed fixed cost | $f^T(\epsilon)$ | |
| Income before taxes | $P^T(\epsilon)$ | |

In Table 9 the notations are as follows.

$$f^T(\epsilon) = \eta(\epsilon) + \gamma(\epsilon) \quad (31)$$

$$\gamma(\epsilon) = (C^F + A^C(\epsilon)) + G^F + U(\epsilon) + (S(\epsilon) + A^S(\epsilon)) - A^H(\epsilon) \quad (32)$$

$$= C^F + G^F + U(\epsilon) + S(\epsilon) - A^R(\epsilon)$$

It is obvious that the symbol $-A^H(\epsilon)$ shows the effects of both $A^C(\epsilon) + A^S(\epsilon)$ being offset and a decrease of expenses due to $A^R(\epsilon)$ in Eq.(32). It is seen from Eq.(31) and Eq.(32) that $f^T(\epsilon)$ consists of only actual and fixed costs (not relating to sales increase or decrease). These terms are those that are used in financial accounting.

If Table 9 is compared with Table 3, it can be seen that when drawing a managed gross profit chart for $P^T(\epsilon)$, $f^T(\epsilon)$ is used in place of $f^P(\epsilon)$.

By observing Table 9, every term in the table except $f^T(\epsilon)$ is broken down into each manufacturing direct cost department. Therefore, if a breakdown of Table 9 into each department is wanted, a breakdown basis of each manufacturing direct cost department for $f^T(\epsilon)$ will be needed.

The introduction of the following notations converts Eq.(31) to (33).

$\{\ \}_{mi}$: Indicating direct costs part of the mi-department within the symbols $[\ ]$: Indicating common costs part with respect to m-department within the symbols $<\ >_{mi}$: Indicating the breaking down into each mi-department under the breakdown basis for the costs within the symbols $$f^T(\epsilon)_{mi} = \eta(\epsilon)_{mi} + \{\gamma(\epsilon)\}_{mi} + <[\gamma(\epsilon)]>_{mi} \quad (33)$$

As a result, Table 9 can be broken down into each mi-department as shown in Table 10. Table 10 can be converted to FIG. 2 for each mi-department.

TABLE 10

| Items | Debit | Credit |
|---|---|---|
| Managed gross profit | | $Q^M(\epsilon)_{mi}$ |
| Manufacturing overhead applied in goods sold | | $A^X(\epsilon)_{mi}$ |
| Managed fixed cost | $f^T(\epsilon)_{mi}$ | |
| Income before taxes | $P^T(\epsilon)_{mi}$ | |

The contents of the breakdown basis for $f^T(\epsilon)$ may be determined at a company's discretion. However, in this specification, adopting such a breakdown basis is recommended, as every business division can previously agree with each other when making $<[\gamma(\epsilon)]>_{mi}$. Example methods are as follows: (1) adopting the ratio of $A^X(\epsilon)_{mi}/A^X(\epsilon)$ for costs of the current period or accumulated costs during several periods, (2) adopting the ratio of $X(\epsilon)_{mi}/X(\epsilon)$ for the current period or several periods and so forth.

Table 11 shows an example of the income statement of a company which consists of two manufacturing direct cost departments (m1 and m2) and two manufacturing indirect cost departments (c1 and c2).

TABLE 11

| | | Departments | | | | | |
|---|---|---|---|---|---|---|---|
| | | Total | | m1 | | m2 | |
| | Items | Debit | Credit | Debit | Credit | Debit | Credit |
| x | $X(\epsilon)$ | | 1,000 | | {600} | | {400} |
| | $D^X(\epsilon)$ | 700 | | {430} | | {270} | |
| | $A^X(c1)$ | 95 | | {60} | | {35} | |
| | $A^X(c2)$ | 85 | | {45} | | {40} | |
| c | $C^F(c1)$ | 100 | | | | | |
| | $C^F(c2)$ | 90 | | | | | |
| | $A^C(c1)$ | 30 | | | | | |
| | $A^C(c2)$ | | 30 | | | | |
| | $A^Y(c1)$ | 135 | | {80} | | {55} | |
| | $A^Y(c2)$ | 70 | | {40} | | {30} | |
| | $A^S(\epsilon)$ | 5 | | {3} | | {2} | |
| | $A^R(\epsilon)$ | | [10] | | | | |
| g | $G^F$ | [85] | | | | | |
| u | $U(\epsilon)$ | [10] | | | | | |
| s | $S(\epsilon)$ | [10] | | | | | |
| | $A^S(\epsilon)$ | 5 | | {3} | | {2} | |
| z | $P^T(\epsilon)$ | 40 | | | | | |
| r | $A^R(\epsilon)$ | [10] | | | | | |

Figure 6:
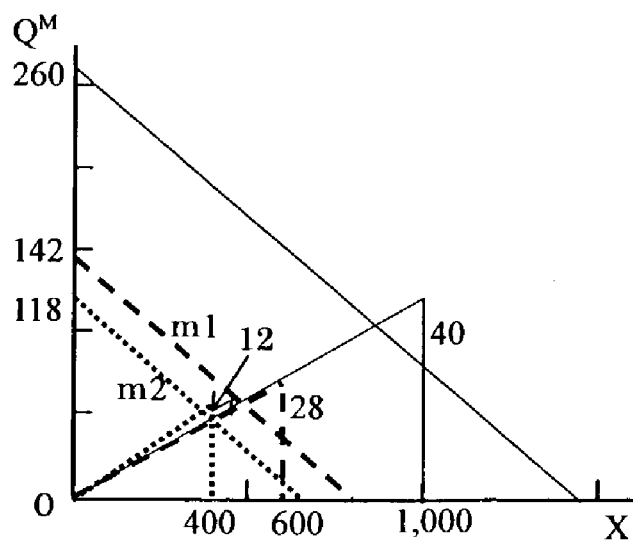
FIG. 6 shows the managed gross profit chart corresponding to Table 12.

Let $G^V = 0$.
$A^{X(-)}(\epsilon) = 25$,
$A^{X(-)}{}_{m1}(\epsilon) = 15$,
$A^{X(-)}{}_{m2}(\epsilon) = 10$
$A^{X(0)}(\epsilon) = A^{Y(0)}(\epsilon) = 180 - 25 = 155$
$A^{X(0)}(\epsilon)_{m1} = 105 - 15 = 90$,
$A^{X(0)}(\epsilon)_{m2} = 75 - 10 = 65$
$A^{Y(+)}(\epsilon) = 205 - 155 = 50$
$A^{Y(+)}(\epsilon)_{m1} = 120 - 90 = 30$,
$A^{Y(+)}(\epsilon)_{m2} = 85 - 65 = 20$
$\eta(\epsilon) = 25 - 50 = -25$
$\eta_{m1}(\epsilon) = 15 - 30 = -15$,
$\eta_{m2}(\epsilon) = 10 - 20 = -10$
$A^H(\epsilon) = 30 + 5 + 10 = 45$ As a breakdown basis for $f^T(\epsilon)$, the ratio of $A^X(\epsilon)_{mi}/A_X(\epsilon)$ for $C^F$ after the past three years and the ratio of $X(\epsilon)_{mi}/X(\epsilon)$ after the past three years for the other terms have been adopted. Table 11 is transformed into Table 12. Table 12 is transformed into the managed gross profit charts of m1 and m2 departments as shown in FIG. 6.

TABLE 12

| Items | | Total | | m1 | | m2 | |
|---|---|---|---|---|---|---|---|
| Symbols | Notes | Debit | Credit | Debit | Credit | Debit | Credit |
| $Q^M(\epsilon)$ | | | 120 | | 65 | | 55 |
| $A^X(\epsilon)$ | | | 180 | | 105 | | 75 |
| $f^T(\epsilon)$ | | 260 | | 142 | | 118 | |
| $\eta(\epsilon)$ | | -25 | | -15 | | -10 | |
| $C^F(c1)$ | $A^X$ ratio | 100 | | 55 | | 45 | |
| $C^F(c2)$ | $A^X$ ratio | 90 | | 54 | | 36 | |
| $G^F$ | Sales ratio | 85 | | 43 | | 42 | |
| $U(\epsilon)$ | Sales ratio | 10 | | 5 | | 5 | |
| $S(\epsilon)$ | Sales ratio | 10 | | 5 | | 5 | |
| $-A^R(\epsilon)$ | Sales ratio | -10 | | -5 | | -5 | |
| $P^T(\epsilon)$ | | 40 | | 28 | | 12 | |

Average $A^X$ ratio for past 3 years
$A^X(c1)_{m1} : A^X(c1)_{m2} = 55:45$
$A^X(c2)_{m1} : A^X(c2)_{m2} = 60:40$
Average sales ratio for past 3 years
$X(m1) : X(m2) = 50:50$ If it is understood in advance that the contents of $f^T(\epsilon)$ are equal to Eq.(31) and Eq.(32), it is possible to break down directly Table 11 into each mi-department by not using Table 12. In practical making of income statements, for example, there is a case where actual manufacturing overheads and applied manufacturing overheads (or transfer expenses)

from other departments are mixed at the debit so that the costs can not be broken down clearly as in the manner of Table 11. In such a case, if figures associated with $f^T$ are totalized at the debit and the breakdown basis to the debit is used, the figures aimed at are obtained by offset as a result.

In the case where the 2nd kind of manufacturing overhead (manufacturing overheads applied that are fixed or semi-fixed to sales) exists, it is possible to substitute the terms associated with the 1st and 2nd kind of manufacturing overheads in place of the terms of the 1st kind in each equation presented in this specification. Furthermore, in the managed gross profit chart in which the 2nd kind of manufacturing overhead exists, parallel displacement of the lines L1, L2, L3 in the case of only the 1st kind of manufacturing overhead as much as the 2nd kind of manufacturing overhead applied should be made downward.

Table 12 shows the result in which the company's profit has been finally broken down into each mi-department treating with direct costs so that the idea of departmental profits disappears except within each mi-department. However, it is possible to evaluate the business performance of each department by using the ideas, for example, managed gross profits (or managed operating incomes) at manufacturing direct cost departments and departmental variances at the other departments.

REFERENCES

[1] Hayashi, Y.: Method of charting expression for company's profit, Japanese Laid Open Patent No. H9-305677, 1997.
[2] Patrick, A. W.: Some Observations on the Break Even Chart, The Accounting Review, October 1958, pp.573-580.
[3] Brummet, R. L.: Overhead Costing, The Costing of Manufactured Products, 1957.
[4] Kubota, O: Direct standard costing, Chikurashobou, pp.145-156, 1965.
[5] Solomons, D.: Breakeven Analysis under Absorption Costing, The Accounting Review, July 1968, pp.447-452.

Description of the Tables

Table 1 shows an ordinary income statement for an operating income of a company adopting absorption costing.

Tables 2(a), 2(b), 2(c) and 2(d) show individual income statements made by management accounting departments of accompany consisting of; a selling department, manufacturing direct cost departments, manufacturing indirect cost departments, and a profit and loss summary department in a company adopting absorption costing.

Table 3 is an operating income statement to transform Table 1 into a profit chart.

Table 4 is an example given in order to compare the applicant's theory with Solomons' theory.

Table 5 is the income statement corresponding to the break-even sales given by the applicant's Eq.(19).

Table 6 is the income statement corresponding to the break-even sales given by Solomons' Eq.(23).

Table 7 shows a breakdown of the total of applied manufacturing overheads distributed by every manufacturing indirect cost department.

Table 8 is the income statement for the income before taxes per one company in the case of Table 7.

Table 9 is the data sheet, for the income before taxes per one company, transformed from Table 8 to make a profit chart.

Table 10 shows the individual income statement for each direct cost department broken down from Table 9.

Table 11 shows an example of when several manufacturing direct cost departments (2 in this case), and several manufacturing indirect cost departments (2 in this case), exist. In this table it is assumed that G=GF=fixed costs.

Table 12 is the resulting data sheet that is used to make a profit chart from Table 11.

Description of the symbols

A: Manufacturing overhead applied c: c=c1, c2, . . . , cn; all of the individual manufacturing indirect cost departments C: Manufacturing overhead (actual)

D: Manufacturing direct cost (actual)

E: Full manufacturing cost; D+A f: Intercept value between the origin and the intersection of the vertical-axis with the marginal managed gross profit line; Managed fixed cost g: Selling and general administrative expenses department G: Selling and general administrative expenses (actual); GF (fixed)+GV (variable)

m: m=m1 ,m2 , . . . , mn; all of the individual manufacturing direct cost departments $P^M$: Managed operating income; $Q^M$–G $P^P$: Operating income on sales; Q–G $P^T$: Income before taxes on sales Q: Gross profit on sales $Q^M$: Managed gross profit; X–E $Q^M_\xi$: Marginal managed gross profit; G+δ r: Asset department excluding inventories s: Extraordinary profit and loss department S: Extraordinary loss (minus profit)

u: Non-operating expense department

U: Non-operating expense (minus revenue)

X: Sales x: Quantity of goods sold y: Quantity of goods produced z: Profit and loss summary department or profit and loss summary calculation α: Ratio of applied manufacturing overhead to sales–Ratio of variable selling and general administrative expenses to sales; $A^X/X - G^V/X$ β: Ratio of managed gross profit to sales; $Q^M/X$ δ: Production overhead variance; $C^F - A^Y$ ε: Expressing accounting data in income statement η: Net carryover manufacturing overhead applied in inventories. See Eq.(2).

φ: Expressing break-even point under absorption costing $φ_0$: Expressing break-even point under direct costing γ: Terms in $f^T$ excluding η. See Eq.(32).

ω: Expressing that data is at capacity

Superscript (−): Expressing that cost belongs to year-beginning inventory

Superscript (+): Expressing that cost belongs to year-end inventory

Superscript (0): Expressing cost not included in inventory

Superscript C: Expressing internal transactions among c-departments (c=c1, c2, . . . cn)

Superscript F: Expressing fixed cost

Superscript H: Expressing the right hand side of Eq.(30)

Superscript M: Expressing relation to managed gross profit or managed operating income Superscript P: Expressing the relation to operating income Superscript R: Expressing internal transactions between r-department and c-department Superscript S: Expressing internal transactions between s-department and c-department Superscript T: Expressing the relation to income before taxes Superscript V: Expressing variable cost Superscript X: Expressing manufacturing cost of goods sold Superscript Y: Expressing manufacturing cost of goods produced Subscripts ci,w: Expressing transfer revenue of ci-department from w-department Subscript mi: Expressing mi-manufacturing direct cost department Subscript $\xi$: Expressing that $Q^M(\epsilon)$ is under the marginal condition of $P^P(\epsilon)=0$ $\{\ \}_{mi}$: Expressing direct costs part of the mi-department within the symbols

[ ]: Expressing common costs part with respect to m-department within the symbols $<\ >_{mi}$: Indicating the breaking down into each mi-department under the breakdown basis for the costs within the symbols

3. Embodiments

This invention enables managed gross profit charts on the basis of the managed gross profit theory to be communicated over computer information networks. This provides a new business tool to information technology companies, corporate accountants and business consultants.

Figure 5:
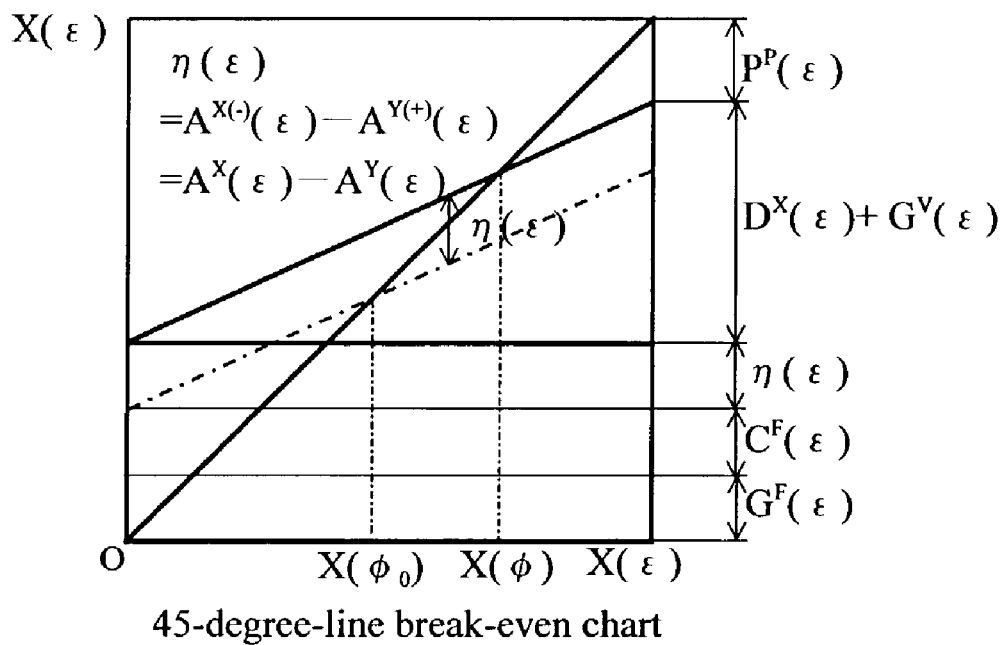
FIG. 5 shows the contents of claim 1.

Claim 1 states how to draw the 45-degree-line break-even chart shown in FIG. 5. The claim also explains how computer computation is involved. FIG. 5 shows a break-even chart for an operating income statement under absorption costing. However, it is clear that the operating income chart can be changed to an income before taxes chart by using Eq.(31) in place of Eq.(10).

Figure 7:
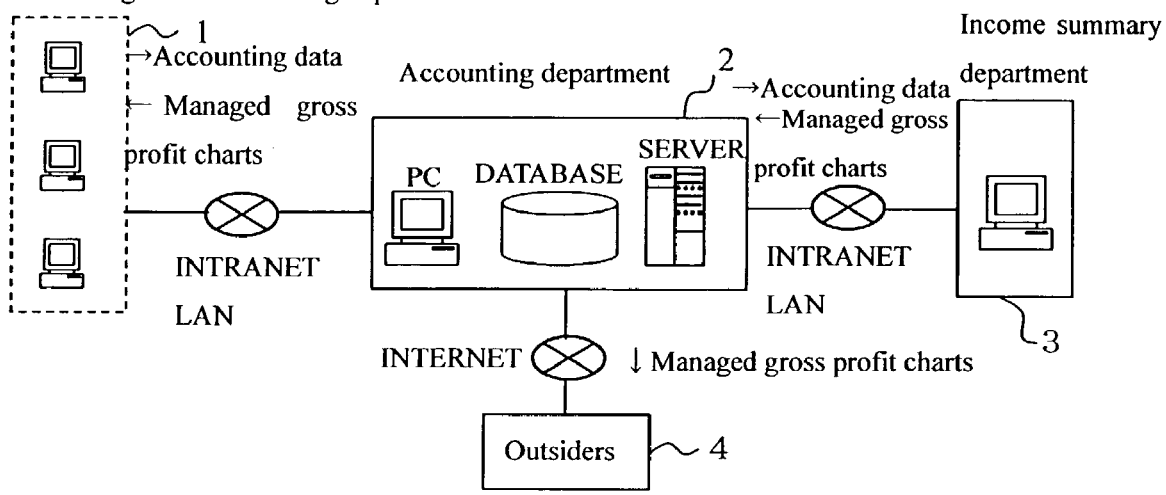
FIG. 7 shows the contents of claim 2.

FIG. 7 illustrates the contents of claim 2. Block 1 shows the management accounting departments in a company adopting absorption costing, Block 2 shows a personal computer (PC), a management accounting database and a server, Block 3 shows a profit and loss summary department, and Block 4 shows outsiders of the company. If a large quantity of data from Block 1 is going to be sent to Block 2, it should be compacted, in advance, by each department, so that only the data needed for the managed gross profit chart is sent to Block 2. Block 3 takes out the necessary data for making the charts from Block 2, computes the charts by use of the managed gross profit theory described in this specification, and sends the pictures of the charts back to Block 2. Block 1 can then accesses the managed gross profit charts disclosed by Block 2.

Figure 8:
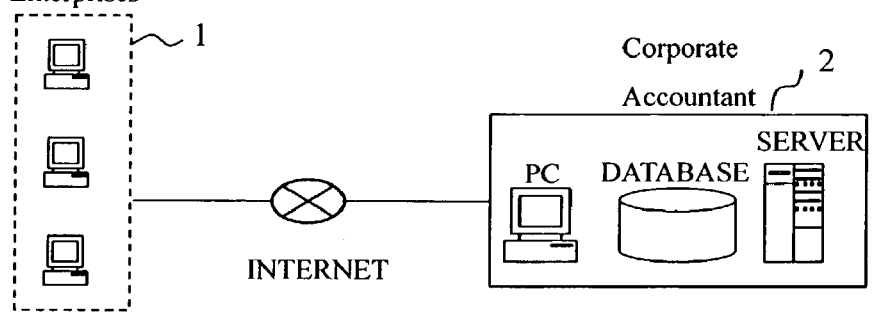
FIG. 8 shows the contents of claim 3.

FIG. 8 illustrates the contents of claim 3. Block 1 shows several companies adopting absorption costing, and Block 2 shows corporate accountants and business consultants. Block 1 sends data to Block 2, over the internet, which are made under instructions by Block 2. Block 2 transforms the data into the managed gross profit charts on the basis of its theory, and sends them to Block 1.

Claim 4 states a business that gives material papers corresponding to FIG. 2 or FIG. 5 to an income statement in order to illustrate management conditions of companies.

From a logical point of view, when carrying out the management accounting in a factory, the profit that should be aimed at is the managed gross profit. This invention has made clear the mathematical relationships between C(cost), V(volume) and P(profit) under absorption costing and enabled charting of the relationships as managed gross profit charts. Therefore, if companies adopting absorption costing consider that the disclosure of management conditions with some profit charts over a computer information network is indispensable and they expect to construct a unified accounting system incorporating financial accounting and management accounting, this applicant's accounting system which is based on the managed gross profit theory will be the only system that satisfies their expectation.

The invention claimed is:

1. A business method of accounting using absorption costing, including a method of drawing a break-even chart, the break even chart expressed using a 45-degree line obtained from an income statement of a company which adopts absorption costing including standard costing as an input measurement basis, in which standard costing comprises costing based on an intra-company transfer price system, the income statement generated using absorption costing by the use of computer calculations, the business method comprising the steps of:
setting up rectangular coordinates, with a horizontal axis as sales X and a vertical axis as cost+profit sales, defining $\eta$=net carryover manufacturing overhead applied in inventories=manufacturing overhead applied in year-beginning inventory−manufacturing overhead applied in year-end inventory, treating C+G+$\eta$ as fixed costs where C=actual manufacturing overhead and G=selling and actual general administrative expenses, drawing a fixed-cost line parallel to X-axis, treating manufacturing direct cost in actual goods sold $D^X$ as a variable cost, drawing a variable-cost line increasing to the right through the intersection of the vertical axis with the said fixed-cost line, drawing a 45-degree line increasing to the right through the origin, determining the break-even point for the operating income obtained from the income statement generated under absorption costing by identifying the intersection of the variable-cost line with the 45-degree line.

2. A business method of accounting using absorption costing as claimed in claim 1, the company comprising a plurality of manufacturing direct cost departments, the business method further comprising breaking down the income statement into an individual income statement for each manufacturing direct cost department, providing each departmental income chart, referred to as a "managed gross profit chart", and drawing the managed gross profit chaff for each of the income statements in absorption costing by the use of computer calculations, such that the business method comprises the further steps of:

applying the method to a company adopting said absorption costing, and having a management accounting system comprising of several manufacturing direct cost departments (m=m1, m2, . . . , mn), several manufacturing indirect cost departments (c=c1, c2, . . . , cn) a selling and general administrative expenses department (g), a non-operating expense department (u) and an extraordinary profit and loss department (s), indicating symbols per one company as: X=sales, $D^X$=manufacturing direct cost in goods sold (actual, variable), $C^F$=actual, fixed manufacturing overhead, $A^X$=manufacturing overhead applied for goods sold, $\eta$=said net carryover manufacturing overhead applied in inventories, G=$G^F$=selling and general administrative expenses (assumed as fixed cost), U=non-operating expense minus revenue, S=extraordinary loss minus profit, $A^R$=applied manufacturing overhead apportioned to any asset except inventories, $P^T$=income before taxes, defining
$E^X = D^X + A^X$ =full manufacturing cost,
$Q^M = X - E^X$ =managed gross profit,
$f^T = \eta + C^F + G^F + U + S - A^R$ =managed fixed cost, setting up rectangular coordinates with X-axis horizontal and $Q^M$-axis vertical, transforming the income statement into an income statement in which the term $[f^T + P^T]$ is located at debit and the term $[Q^M + A^X]$ is located at credit, breaking down $f^T$ into each individual mi-department expense, by using a proper breakdown basis for $f^T$ by use of computer calculations, breaking down $[Q^M + A^X]$ into each $[Q^M_{mi} + A^X_{mi}]$ and $P^T$ into each $P^T_{mi}$, converting the income statement of mi-department to the account form in which $[f^T_{mi} + P^T_{mi}]$ is located at debit and $[Q^M_{mi} + A^X_{mi}]$ is located at credit, drawing a line L1 which starts at the intercept $f^T_{mi}$ on the vertical axis and has a slope of $A^X_{mi}/X_{mi}$, which declines to the right, drawing an inclined line L2 passing through the origin (0, 0) and the point $(X_{mi}, Q^M_{mi})$, drawing a vertical line L3 from the point $(X_{mi}, 0)$ to the point $(X_{mi}, Q^M_{mi})$, equating $P^T_{mi}$ with the difference between the line L1 and the line L2 on the line L3, determining the break-even point for each mi-department income statement in absorption costing by identifying the intersection of the line Li with the line L2 for each mi-department income statement.

3. A business method of accounting using absorption costing as claimed in claim 2, further comprising a method of disclosing said charts to persons of management accounting departments over the computer information network system, the business method comprising the further steps of:

applying the method to a company adopting said absorption costing, and having a management accounting system comprising of several manufacturing direct cost departments (m=m1, m2, . . . , mn), several manufacturing indirect cost departments (c=c1, c2, . . . , cn), a selling and general administrative expenses department (g), a non-operating expense department (u), an extraordinary profit and loss department (s) and a profit and loss summary department (z); all the accounting departments are connected with a computer information network system, transforming the income statement per one company into profit charts, namely the break-even chart expressed using the said 45-degree line and the said managed gross profit chart, sending accounting data from these management accounting departments to a server over the computer information network system, taking out the accounting data needed by the profit and loss summary department from the server, and adding other data needed in management, storing the charts, the gross profit charts or the 45-degree-line break-even chart, transformed from the data given in the preceding paragraph, providing the charts to persons of management accounting departments over the computer information network system, disclosing the chart information to persons concerned with the company by the use of the computer information network system.

4. A business method of accounting using absorption costing as claimed in claim 3, consisting of the company and a provider of accounting advice for the company, with the said profit charts communicated between the company and the provider, the business method comprising the further steps of:

sending the accounting data to the provider's server by the company, over the computer information network system, transforming the accounting data into profit charts including the said break-even chart expressed using a 45-degree line and the said managed gross profit chart by the provider, sending information such as these charts to the company by the provider in the reverse course.

5. An accounting system for use by a company which employs full costing absorption costing as an accounting method, the accounting system identifying the break-even point in a break-even chart obtained using a company income statement generated in said absorption costing by the use of computer calculations, the break-even chart expressed using a 45-degree line, the accounting system comprising plural computing devices operably interconnected with a server and database through a computer network, wherein the server performs calculations based on the income statement of a company which adopts said absorption costing, or costing based on an intra-company transfer price system, to generate the break even chart, the break-even chart generated by setting up rectangular coordinates, with a horizontal axis as sales X and a vertical axis as cost+profit sales, defining η=net carryover manufacturing overhead applied in inventories=manufacturing overhead applied in year-beginning inventory−manufacturing overhead applied in year-end inventory, treating C+G+η as fixed costs, where C=actual manufacturing overhead and G=selling and actual general administrative expenses, drawing a fixed-cost line parallel to the X-axis, treating manufacturing direct cost in actual goods sold $D^X$ as a variable cost, drawing a variable-cost line increasing to the right through the intersection of the vertical axis with the fixed-cost line, drawing a 45-degree line increasing to the right through the origin, identifying the intersection of the variable-cost line with the 45-degree line as the break-even point for the operating income in the company income statement under said absorption costing.

6. The accounting system of claim 1, wherein the company comprises a plurality of manufacturing direct cost departments, the accounting system breaking down the company income statement into an individual income statement for each manufacturing direct cost department, providing each departmental income chart, referred to as a "managed gross profit chart", and drawing the managed gross profit chart for each of the individual income statements using computer calculations performed by the server, the accounting system encompassing one company having several manufacturing direct cost departments (m=m1, m2, . . . , mn), several manufacturing indirect cost departments (c=c1, c2, . . . , cn), a selling and general administrative expenses department (g), a non-operating expense department (u) and an extraordinary profit and loss department (s), in which the following symbols are used: X=sales, $D^X$=manufacturing direct cost in actual, variable goods sold, $C^F$=actual, fixed manufacturing overhead, AX=manufacturing overhead applied for goods sold, η=said net carryover manufacturing overhead applied in inventories, $G=G^F$=selling and general administrative expenses, which are assumed as fixed cost, U=non-operating expense minus revenue, S=extraordinary loss minus profit, $A^R$=applied manufacturing overhead apportioned to any asset except inventories, $P^T$=income before taxes, the managed gross profit charts generated by:

defining $EX=D^X+A^X$=full manufacturing cost, $Q^M=X-E^X$=managed gross profit, $f^T=η+C^F+G^F+U+S-A^R$=managed fixed cost, setting up a rectangular coordinates with an X-axis horizontal and Q -axis vertical, transforming the income statement into a transformed income statement in which the term $[f^T+P^T]$ is located at debit and the term $[Q^M+A^X]$ is located at credit, breaking down $f^T$ into each individual mi-department expense, by using a proper breakdown basis for $f^T$ by use of computer calculations, breaking down $[Q^M+A^X]$ into each $[Q^M_{mi}+A^X_{mi}]$ and $P^T$ into each $P^T_{mi}$, converting the income statement of mi-department to the account form in which $[f^T_{mi}+P^T_{mi}]$ is located at debit and $[Q^M_{mi}+A^X_{mi}]$ is located at credit, drawing a line L1 which starts at the intercept $f^T_{mi}$ on the vertical axis and has a slope of $A^X_{mi}/X_{mi}$ which declines to the right, drawing an inclined line L2 passing through the origin (0, 0) and the point $(X_{mi}, Q^M_{mi})$, drawing a vertical line L3 from the point $(X_{mi}, 0)$ to the point $(X_{mi}, Q^M_{mi})$, equating $P^T_{mi}$ with the difference between the line Li and the line L2 on the line L3, identifying the intersection of the line Li with the line L2 as the break-even point for each mi-department income statement in said absorption costing.

7. The accounting system of claim 6, wherein profit charts are disclosed to persons of management accounting departments over the computer network, the profit charts comprising the break-even chart for the company and the managed gross profit charts for each manufacturing direct cost department, wherein disclosure of the profits charts is accomplished by the steps of:

sending said profit charts from the management accounting departments to a server over the computer network, storing the profit charts in said server, providing the profit charts to said persons of management accounting departments over the computer network, disclosing the profit chart information to said persons concerned with the company by the use of the computer network.

8. The accounting system of claim 7, wherein the company comprises a pluralities of companies, each of the plurality of companies comprising management accounting departments, and wherein a provider provides accounting advice for the companies in which the profit charts are communicated between the companies and the provider, wherein communication of the profit charts between the companies and the provider is accomplished by the steps of:

sending by the companies of the accounting data on which the profit charts are based to the provider's server over the computer network, transforming the said accounting data into said profit charts by the provider, sending the profit charts from the provider to the companies in the reverse course.

9. A business method of accounting using absorption costing, including a method of drawing a break-even chart, the break even chart expressed using a 45-degree line obtained from an income statement of a company which adopts absorption costing including standard costing as an input measurement basis, in which standard costing comprises costing based on an intra-company transfer price system, the income statement generated using full costing absorption costing by the use of computer calculations, the business method comprising the steps of:

setting up rectangular coordinates, with a horizontal axis as sales X and a vertical axis as cost+profit sales, defining η=net carryover manufacturing overhead applied in inventories=manufacturing overhead applied in year-beginning inventory–manufacturing overhead applied in year-end inventory, treating C+G+η as fixed costs where C=manufacturing overhead (actual) and G=selling and actual general administrative expenses, drawing a fixed-cost line parallel to X-axis, treating manufacturing direct cost in actual goods sold $D^X$ as a variable cost, drawing a variable-cost line increasing to the right through the intersection of the vertical axis with the said fixed-cost line, drawing a 45-degree line increasing to the right through the origin, determining the break-even point for the operating income obtained from the income statement generated under absorption costing by identifying the intersection of the variable-cost line with the 45-degree line, wherein the company comprises a plurality of manufacturing direct cost departments, the business method further comprising breaking down the income statement into an individual income statement for each manufacturing direct cost department, providing each departmental income chart, referred to as a "managed gross profit chart", and drawing the managed gross profit chart for each of the income statements in absorption costing by the use of computer calculations, such that the business method comprises the further steps of:

applying the method to a company adopting said absorption costing, and having a management accounting system comprising of several manufacturing direct cost departments (m=m1, m2, . . . , mn), several manufacturing indirect cost departments (c=c1, c2, . . . , cn) a selling and general administrative expenses department (g), a non-operating expense department (u) and an extraordinary profit and loss department (s), indicating symbols per one company as: X=sales, $D^X$=manufacturing direct cost in actual, variable goods sold, $C^F$=actual, fixed manufacturing overhead, $A^X$=manufacturing overhead applied for goods sold, η=said net carryover manufacturing overhead applied in inventories, $G=G^F$=selling and general administrative expenses, which are assumed as a fixed cost, U=non-operating expense minus revenue, S=extraordinary loss minus profit, $A^R$=applied manufacturing overhead apportioned to any asset except inventories, $P^T$=income before taxes, defining $E^X=D^X+A^X$=full manufacturing cost, $Q^M=X-E^X$=managed gross profit, $f^T=η+C^F+G^F+U+S-A^R$=managed fixed cost, setting up rectangular coordinates with X-axis horizontal and $Q^M$-axis vertical, transforming the income statement into an income statement in which the term $[f^T+P^T]$ is located at debit and the term $[Q^M+A^X]$ is located at credit, breaking down $F^T$ into each individual mi-department expense, by using a proper breakdown basis for $F^T$ by use of computer calculations, breaking down $[Q^M+A^X]$ into each $[Q^M_{mi}+A^X_{mi}]$ and $P^T$ into each $P^T_{mi}$, converting the income statement of mi-department to the account form in which $[f^T_{mi}+P^T_{mi}]$ is located at debit and $[Q^M_{mi}+A^X_{mi}]$ is located at credit, drawing a line L1 which starts at the intercept $f^T_{mi}$ on the vertical axis and has a slope of $A^X_{mi}/X_{mi}$, which declines to the right, drawing an inclined line L2 passing through the origin (0, 0) and the point $(X_{mi}, Q^M_{mi})$, drawing a vertical line L3 from the point $(X_{mi}, 0)$ to the point $(X_{mi}, Q^M_{mi})$, equating $P^T_{mi}$ with the difference between the line L1 and the line L2 on the line L3, determining the break-even point for each mi-department income statement in absorption costing by identifying the intersection of the line L1 with the line L2 for each mi-department income statement.

10. A business method of accounting using absorption costing as claimed in claim 9, further comprising a method of disclosing said charts to persons of management accounting departments over the computer information network system, the business method comprising the further steps of:

applying the method to a company adopting said absorption costing, and having a management accounting system comprising of several manufacturing direct cost departments (m=m1, m2, . . . , mn), several manufacturing indirect cost departments (c=c1, c2, . . . , cn), a selling and general administrative expenses department (g), a non-operating expense department (u), an extraordinary profit and loss department (s) and a profit and loss summary department (z); all the accounting departments are connected with a computer information network system, transforming the income statement per one company into profit charts, namely the break- even chart expressed using the said 45-degree line and the said managed gross profit chart, sending accounting data from these management accounting departments to a server over the computer information network system, taking out the accounting data needed by the profit and loss summary department from the server, and adding other data needed in management, storing the charts, the gross profit charts or the 45-degree-line break-even chart, transformed from the data given in the preceding paragraph, providing the charts to persons of management accounting departments over the computer information network system, disclosing the chart information to persons concerned with the company by the use of the computer information network system.

11. A business method of accounting using absorption costing as claimed in claim 10, consisting of the said company and a provider of accounting advice for the company, with the said profit charts communicated between the company and the provider, the business method comprising the further steps of:

sending the accounting data to the provider's server by the said company, over the computer information network system, transforming the accounting data into profit charts including the said break-even chart expressed using a 45-degree line and the said managed gross profit chart by the provider, sending information such as these charts to the company by the provider in the reverse course.

* * * * *

UNITED STATES PATENT AND TRADEMARK OFFICE
CERTIFICATE OF CORRECTION

PATENT NO.        : 7,302,409 B2
APPLICATION NO.   : 10/335813
DATED             : November 27, 2007
INVENTOR(S)       : Hayashi It is certified that error appears in the above-identified patent and that said Letters Patent is hereby corrected as shown below:

On Title page:
        Item "(56) References cited", further under "OTHER PUBLICATIONS",
        change "A.W. Patrick, Some Observations On The Break-Even Chart The Accounting Review, pp. 573-580." to --Patrick, A.W. "Some Observations on the Break-Even Chart". *The Accounting Review*, October 1958: pp. 573-580.--;
        change "R.I. Brummet, Overhead Costing, The Costing Of Manufactured Products, 1957." to --Brummet, R.L. *Overhead Costing: The Costing of Manufactured Products*. Ann Arbor, Michigan: Bureau Of Business Research, University Of Michigan, 1957.--;
        change "O. Kubota, Direct Standard Costing Chikurashobou, pp. 145-156, 1965." to --Kubota, O. *Direct Standard Costing*. Chikurashobou, 1965: pp 145-156.--;
        change "David Solomons, Breakeven Analysis Under Absorption Costing The Accounting Review, Jul. 1968, pp. 447-452." to --Solomons, David. "Breakeven Analysis Under Absorption Costing". *The Accounting Review*, July 1968: pp. 447-452.--.
        Item "(57) ABSTRACT",
        3rd line, change "the break even point" to --the break-even point--;
        16th line, change "send said break even" to --send said break-even--.

Column 2:
        Line 19, change "inventories, (5)" to --inventories, and (5)--.
        Line 31, change "for whole amount" to --for the whole amount--;
            change "company is same" to --company is the same--.
        Line 60, change "costing, (2)" to --costing, and (2)--.

Column 3:
        Line 58, change "income statement" to --income statements--.

Column 4:
        Line 14, change "up a rectangular" to --up rectangular--.
        Lines 17, 18, and 19 should be aligned with the left margin (eliminate indentation).
        Line 23, change "and $p^T$" to --and $P^T$--. (Lower case "p" should be upper case --P--.)
        Line 49, change "costs(Under-absorbed" to --costs (under-absorbed--.

UNITED STATES PATENT AND TRADEMARK OFFICE
CERTIFICATE OF CORRECTION

PATENT NO.       : 7,302,409 B2
APPLICATION NO.  : 10/335813
DATED            : November 27, 2007
INVENTOR(S)      : Hayashi It is certified that error appears in the above-identified patent and that said Letters Patent is hereby corrected as shown below:

<u>Column 6</u>:
    Line 1, change "because that this" to --because this--.
    Line 10, change "actual, departmental" to --actual departmental--.
    Line 37 and line 39, change "$\epsilon$" to --$\varepsilon$--.
    Line 50, change "to the quantity" to --for the quantity--.

<u>Column 7</u>:
    TABLE 1, change "$\epsilon$" to --$\varepsilon$-- (all 7 occurrences).
    Line 22, change "$D^Y=D^Y$" to --$D^Y=D^{Y(0)}$--.
    Line 23, change "$_{(o)}+D^{Y(+)}$" to --$+D^{Y(+)}$--.
    Line 30 (Equation 1), change "$\epsilon$" to --$\varepsilon$-- (all 4 occurrences).
    Line 32 (Equation 2), change "$\epsilon$" to --$\varepsilon$-- (all 5 occurrences).
    Line 34 (Equation 3), change "$\epsilon$" to --$\varepsilon$-- (all 3 occurrences).
    Line 37 (Equation 4), change "$\epsilon$" to --$\varepsilon$-- (all 3 occurrences).
    Line 39 (Equation 5), change "$\epsilon$" to --$\varepsilon$-- (all 3 occurrences).
    Line 41 (Equation 6), change "$\epsilon$" to --$\varepsilon$-- (all 3 occurrences).
    Line 43 (Equation 7), change "$\epsilon$" to --$\varepsilon$-- (all 3 occurrences).
    Line 45, change "$\epsilon$" to --$\varepsilon$--.
    Line 46 (Equation 8), change "$\epsilon$" to --$\varepsilon$-- (all 6 occurrences).
    Line 53, change "$Q^M(\epsilon)$" to --$Q^M(\varepsilon)$--.
    Line 54 change "$\delta(\epsilon)$" to --$\delta(\varepsilon)$--.
    Line 56 (all 4 occurrences), line 59, line 61 (all 3 occurrences), and line 63, change "$\epsilon$" to --$\varepsilon$--.

<u>Column 8</u>:
    TABLE 2, part (a), change "$\epsilon$" to --$\varepsilon$-- (all 3 occurrences);
    part (b), change "$\epsilon$" to --$\varepsilon$-- (all 3 occurrences);
    part (c), change "$G(\epsilon)$" to --$G(\varepsilon)$--; change "$Q^{M(\epsilon)}$" to --$Q^M(\varepsilon)$--; change "$P^M(\epsilon)$" to --$P^M(\varepsilon)$--;
    part (d), change "$\epsilon$" to --$\varepsilon$-- (all 3 occurrences).
    Line 22, change "$p^{(M)}$" to --$P^{(M)}$--. (Lower case "p" should be upper case --P--.)

UNITED STATES PATENT AND TRADEMARK OFFICE
CERTIFICATE OF CORRECTION

PATENT NO.      : 7,302,409 B2
APPLICATION NO. : 10/335813
DATED           : November 27, 2007
INVENTOR(S)     : Hayashi It is certified that error appears in the above-identified patent and that said Letters Patent is hereby corrected as shown below:

Column 8 (continued):
    Line 26, change "$\epsilon$" to --$\varepsilon$-- (both occurrences).
    Line 30 (Equation 9), change "$\epsilon$" to --$\varepsilon$-- (all 4 occurrences).
    Line 32 (Equation 10), change "$\epsilon$" to --$\varepsilon$-- (all 4 occurrences).
    Line 34 (Equation 11), change "$\epsilon$" to --$\varepsilon$-- (all 5 occurrences).
    Line 36, line 37 (all 3 occurrences), and line 38, change "$\epsilon$" to --$\varepsilon$--.
    Line 40 (Equation 12), change "$\epsilon$" to --$\varepsilon$-- (all 4 occurrences).
    Line 42 (Equation 13), change "$\epsilon$" to --$\varepsilon$-- (all 3 occurrences).
    Line 46 (Equation 14), change "$\epsilon$" to --$\varepsilon$-- (all 5 occurrences).
    Line 48, change "$\epsilon$" to --$\varepsilon$--;
       change "represented as follows." to --represented as follows:--.
    Line 49 (Equation 15), change "$\epsilon$" to --$\varepsilon$-- (all 3 occurrences).
    Line 54 (all 3 occurrences) and line 57 (both occurrences), change "$\epsilon$" to --$\varepsilon$--.
    Line 58 (Equation 16), change "$\epsilon$" to --$\varepsilon$-- (all 3 occurrences).
    Line 60 (both occurrences), line 61 (all 3 occurrences), and line 63, change "$\epsilon$" to --$\varepsilon$--.

Column 9:
    Line 1 and line 2, change "$\epsilon$" to --$\varepsilon$--.
    Line 4 (Equation 17), change "$\epsilon$" to --$\varepsilon$--.
    Line 6 (Equation 18), change "$\epsilon$" to --$\varepsilon$-- (all 3 occurrences).
    Line 8, change "$\epsilon$" to --$\varepsilon$-- (all 3 occurrences).
    TABLE 3, change "$\epsilon$" to --$\varepsilon$-- (all 4 occurrences).
    Line 35 (Equation 19), change "$\epsilon$" to --$\varepsilon$-- (all 5 occurrences).
    Line 38 and line 44, change "$\epsilon$" to --$\varepsilon$--.
    Line 45 (Equation 20), change "$\epsilon$" to --$\varepsilon$-- (all 5 occurrences).
    Line 47 (Equation 21), change "$\epsilon$" to --$\varepsilon$-- (all 3 occurrences).
    Line 49 (both occurrences), line 50, line 51, line 52 (all 4 occurrences), line 53 (both occurrences), line 54 (both occurrences), line 55 (both occurrences), and line 57, change "$\epsilon$" to --$\varepsilon$--.

UNITED STATES PATENT AND TRADEMARK OFFICE
CERTIFICATE OF CORRECTION

PATENT NO. : 7,302,409 B2
APPLICATION NO. : 10/335813
DATED : November 27, 2007
INVENTOR(S) : Hayashi It is certified that error appears in the above-identified patent and that said Letters Patent is hereby corrected as shown below:

Column 9 (continued):
 Line 58, change "when $P^P(\epsilon)\approx 0$." to --when $P^P(\varepsilon) \dot{=} 0$.--;
  change "$P^P(\epsilon)$ is large" to --$P^P(\varepsilon)$ is large--.
 Line 60 (both occurrences), line 62, line 63 (both occurrences), line 65, line 66, and line 67, change "$\epsilon$" to --$\varepsilon$--.

Column 10:
 Line 1, change "$\epsilon$" to --$\varepsilon$--.
 Line 2, change "$\eta(\epsilon)=C^V$" to --$\eta(\varepsilon) = C^V(\varepsilon)$--.
 Line 3, change "$(\epsilon)=G^V(\epsilon)=0$" to --$=G^V(\varepsilon)=0$--.
 Line 14, change "D. Solomos" to --D. Solomons--.
 Line 43 (in Equation 23), change "$\epsilon$" to --$\varepsilon$-- (all 3 occurrences).
 Line 44 (in Equation 23), change "$\epsilon$" to --$\varepsilon$-- (all 3 occurrences);
  change "$C_F$" to --$C^F$--.
 Line 45 (in Equation 23), change "$A^Y(\epsilon)=(F_m/Q_c) \cdot Q_p X(\phi) X(\epsilon)=$" to --$A^Y(\varepsilon )=(F_m/Q_c) \cdot Q_p X(\phi)/X(\varepsilon)=$--; (Correct the epsilons and restore the slash between X-variable terms.)
  delete "$(-A^Y(\epsilon)+C^F(\epsilon)+G^F$".
 Line 46 (in Equation 23), change "$(\epsilon))/(X(\epsilon)-G^V(\epsilon)-D^X(\epsilon)-A^X(\epsilon))$" to --$(-A^Y(\varepsilon)+C^F(\varepsilon)+G^F(\varepsilon))/(X(\varepsilon)-G^V(\varepsilon)-D^X(\varepsilon)-A^X(\varepsilon))$--.
 Line 51, change "$\epsilon$" to --$\varepsilon$--.
 TABLE 4 (the portion in column 10 only), change "$\epsilon$" to --$\varepsilon$-- (all 5 occurrences).

Column 11:
 TABLE 4 (the continuation portion in column 11 only), change "$\epsilon$" to --$\varepsilon$-- (both occurrences).
 Line 10, line 11, line 12, line 13, and line 14, change "$\epsilon$" to --$\varepsilon$--.
 Line 17, change "are as follows." to --are as follows:--.
 Line 26, change "are shown as follows." to --are shown as follows:--.
 Line 35, change "and are as follows." to --and are as follows:--.

UNITED STATES PATENT AND TRADEMARK OFFICE
CERTIFICATE OF CORRECTION

PATENT NO.       : 7,302,409 B2
APPLICATION NO.  : 10/335813
DATED            : November 27, 2007
INVENTOR(S)      : Hayashi It is certified that error appears in the above-identified patent and that said Letters Patent is hereby corrected as shown below:

Column 11 (continued):
  TABLE 5, change "$\epsilon$" to --$\varepsilon$-- (all 7 occurrences).
  Line 57, line 58, line 59, line 60, line 61, line 62, and line 63, "$\epsilon$" to --$\varepsilon$--.

Column 12:
  TABLE 6, change "$\epsilon$" to --$\varepsilon$-- (all 7 occurrences).
  Line 12, line 13, line 14, line 15, line 16, line 17, line 20 (both occurrences), line 21 (all 3 occurrences), line 23 (all 3 occurrences), line 24, line 25 (both occurrences), line 27, and line 28, change "$\epsilon$" to --$\varepsilon$--.
  Line 58, change "(Under-absorbed" to-- (under-absorbed--.

Column 13:
  Line 24, line 26, line 27 (all 3 occurrences), and line 32 (all 6 occurrences), change "$\epsilon$" to --$\varepsilon$--.
    Line 33, change "$A^{X(0)}(\epsilon)$" to --$A^{X(0)}(\varepsilon)$--;
      change "$A^X(\epsilon)$" to --$A^X(\varepsilon)$--;
      change "$D^X(\epsilon)$" to --$D^X(\varepsilon)$--;
      change "$X(\epsilon) = X$" to --$X(\varepsilon)$=--.
    Line 34, change "$(\omega)=$" to --$X(\omega)=$--;
      change "$\eta(\epsilon)$" to --$\eta(\varepsilon)$--.
  Line 35, change "$\epsilon$" to --$\varepsilon$-- (both occurrences).
  Line 36, change "$\epsilon$" to --$\varepsilon$-- (both occurrences);
    delete "$Q^M_\xi$".
  Line 37, change "$(\epsilon)(Eq.(13))$" to --$Q^M_\xi(\varepsilon)(Eq.(13))$--;
    change "$P^P(\epsilon)$" to --$P^P(\varepsilon)$--.
  Line 40, line 44 (all 4 occurrences), and line 48, change "$\epsilon$" to --$\varepsilon$--.
  Line 50, change "$Q^M_v(\phi_0)(Eq.$" to --$Q^M_\xi(\phi_0)(Eq.(13))$=--.
  Line 51, delete "13))=".
    Line 53 (both occurrences), line 55 (both occurrences), line 56, line 57, line 58, line 62 (all 4 occurrences), line 63, line 64 (all 4 occurrences), and line 65, change "$\epsilon$" to --$\varepsilon$--.

UNITED STATES PATENT AND TRADEMARK OFFICE
CERTIFICATE OF CORRECTION

PATENT NO. : 7,302,409 B2
APPLICATION NO. : 10/335813
DATED : November 27, 2007
INVENTOR(S) : Hayashi It is certified that error appears in the above-identified patent and that said Letters Patent is hereby corrected as shown below:

Column 13 (continued):
  Line 66, change "$\epsilon$" to --$\varepsilon$-- (all 3 occurrences);
    change "(Eq.(2))=-" to-- (Eq.(2))=--.
  Line 67, change "$(C^F)^2$" to -- $-(C^F)^2$--;
    change "$D^X(\epsilon)$" to --$D^X(\varepsilon)$--.

Column 14:
  Line 1 (both occurrences) and line 2 (both occurrences), change "$\epsilon$" to --$\varepsilon$--.
  Line 3, change "$Q^M(\epsilon)$" to --$Q^M(\varepsilon)$--;
    change "$(X(\omega))-D^X$" to-- $(X(\omega))-D^X$--.
  Line 4, change "$=G^F+G^V$" to --$=G^F+G^V(\varepsilon)$--.
  Line 5, change "$(\epsilon)(\because G^V(\epsilon)$" to-- $(\because G^V(\varepsilon)$--;
    delete "$\delta(\epsilon)$".
  Line 6, change "(Eq.(5))=0," to --$\delta(\varepsilon)$(Eq.(5))=0,--;
    change "$Q^M_\xi(\epsilon)$" to --$Q^M_\xi(\varepsilon)$--;
    change "$G^V(\epsilon)$" to --$G^V(\varepsilon)$--;
    delete "$P^P(\epsilon)$(Eq.".
  Line 7, change "(15))=0." to --$P^P(\varepsilon)$(Eq.(15))=0.--.
  Line 10, line 11, line 15, line 26, line 31, and line 32, change "$\epsilon$" to --$\varepsilon$--.
  Line 35 (Equation 28), change "$\epsilon$" to --$\varepsilon$--.
  Line 38, change "resented as follows." to --resented as follows:--.
  Line 46, change "$\epsilon$" to --$\varepsilon$--.
  Line 51, change "break-even line exists" to --break-even line--.
  Line 52, change "means that sales" to --means is that sales--.
  Line 53, change "$\epsilon$" to --$\varepsilon$--.

Column 15:
  Line 13, change "$\epsilon$" to --$\varepsilon$--.

Column 16:
  Line 28, change "$\epsilon$" to --$\varepsilon$-- (all 3 occurrences).
  Line 36 (Equation 30), change "$\epsilon$" to --$\varepsilon$-- (all 4 occurrences).
  TABLE 8, change "$\epsilon$" to --$\varepsilon$-- (all 12 occurrences).
  TABLE 9, change "$\epsilon$" to --$\varepsilon$-- (all 4 occurrences).

UNITED STATES PATENT AND TRADEMARK OFFICE
CERTIFICATE OF CORRECTION

PATENT NO. : 7,302,409 B2
APPLICATION NO. : 10/335813
DATED : November 27, 2007
INVENTOR(S) : Hayashi It is certified that error appears in the above-identified patent and that said Letters Patent is hereby corrected as shown below:

Column 17:
    Line 3 (Equation 31), change "$\epsilon$" to --$\varepsilon$-- (all 3 occurrences).
    Lines 6 and 8 (Equation 32), change "$\epsilon$" to --$\varepsilon$-- (all 9 occurrences).
    Line 12, line 13 (both occurrences), line 14, line 15, line 19 (both occurrences), line 20, line 21, and line 26, change "$\epsilon$" to --$\varepsilon$--.
    Line 32, change "with respect to m-de-" to --with respect to mi-de- --.
    Line 39 (Equation 33), change "$\epsilon$" to --$\varepsilon$-- (all 4 occurrences).
    TABLE 10, change "$\epsilon$" to --$\varepsilon$-- (all 4 occurrences).
    Line 54, line 58, line 59 (both occurrences), and line 61 (both occurrences), change "$\epsilon$" to --$\varepsilon$--.

Column 18:
    TABLE 11, change "$\epsilon$" to --$\varepsilon$-- (all 9 occurrences).
    Lines 24-34, change "$\epsilon$" to --$\varepsilon$-- (all 14 occurrences).
    Line 36, change "$f^T(\epsilon)$" to --$f^T(\varepsilon)$--;
        change "$A^X(\epsilon)_{mi}/A_X(\epsilon)$" to --$A^X(\varepsilon)_{mi}/A^X(\varepsilon)$--.
    Line 37, change "$\epsilon$" to --$\varepsilon$-- (both occurrences).
    TABLE 12, change "$\epsilon$" to --$\varepsilon$-- (all 8 occurrences).
    Line 62, change "$\epsilon$" to --$\varepsilon$--.

Column 19:
    Line 32, change "on the Break Even" to --on the Break-Even--.
    Line 33, change "The Accounting Review" to --*The Accounting Review*--; change "1958," to --1958:--.
    Lines 35-36, change "Overhead Costing, The Costing of Manufactured Products," to --*Overhead Costing: The Costing of Manufactured Products.*--.
    Line 37, change "Direct standard costing," to --*Direct Standard Costing.*--.
    Line 38, change "pp. 145-156, 1965." to --1965: pp. 145-156.--.
    Line 40, change "The Accounting Review" to --*The Accounting Review*--; change "1968," to --1968:--.
    Line 47, change "accompany" to --a company--.

UNITED STATES PATENT AND TRADEMARK OFFICE
CERTIFICATE OF CORRECTION

PATENT NO. : 7,302,409 B2
APPLICATION NO. : 10/335813
DATED : November 27, 2007
INVENTOR(S) : Hayashi It is certified that error appears in the above-identified patent and that said Letters Patent is hereby corrected as shown below:

Column 20:
  Line 6, change "G = GF" to --$G = G^F$--.
  Line 22, change "GF(fixed) + GV(variable)" to --$G^F$(fixed) + $G^V$(variable)--.
  Line 47, change "ϵ" to --ε--.

Column 21:
  Line 14 and line 15, change "ϵ" to --ε--.
  Line 51, change "can then accesses" to --can then access--.

Column 22:
  Line 13, change "the break even chart" to --the break-even chart--.
  Line 50, change "gross profit chaff" to --gross proft chart--.
  Line 58, change "cn) a" to --cn), a--.

Column 23:
  Line 9, change "managed fiXed cost," to --managed fixed cost,--.
  Line 34, change "of the line Li" to --of the line L1--.

Column 24:
  Line 33, change "the break even chart" to --the break-even chart--.

Column 25:
  Line 11, change "AX" to --$A^X$--.
  Line 21, change "EX" to --$E^X$--.
  Line 25, change "setting up a rectangular" to --setting up rectangular--.
  Line 26, change "and Q -axis vertical" to --and $Q^M$-axis vertical--.
  Line 46, change "the line Li and" to --the line L1 and--.
  Line 48, change "the line Li with" to --the line L1 with--.
  Line 58, change "of the profits charts" to --of the profit charts--.

Column 26:
  Line 2, change "a pluralities of" to --a plurality of--.
  Line 19, change "the break even chart" to --the break-even chart--.

UNITED STATES PATENT AND TRADEMARK OFFICE
CERTIFICATE OF CORRECTION

PATENT NO. : 7,302,409 B2
APPLICATION NO. : 10/335813
DATED : November 27, 2007
INVENTOR(S) : Hayashi It is certified that error appears in the above-identified patent and that said Letters Patent is hereby corrected as shown below:

Column 27:
Line 21, change "breaking down $F^T$" to --breaking down $f^T$--.
Line 22, change "basis for $F^T$" to --basis for $f^T$--.

Signed and Sealed this

Twelfth Day of August, 2008

JON W. DUDAS
*Director of the United States Patent and Trademark Office*